US012568346B2

(12) United States Patent
Sengupta et al.

(10) Patent No.: US 12,568,346 B2
(45) Date of Patent: Mar. 3, 2026

(54) CONFIGURATION OF MULTIPLE SETS OF FREQUENCY RESOURCES FOR BROADCAST AND MULTICAST COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, San Jose, CA (US); Kazuki Takeda, Tokyo (JP); Peter Gaal, San Diego, CA (US); Thomas Stockhammer, Bergen (DE); Javier Rodriguez Fernandez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 17/547,622

(22) Filed: Dec. 10, 2021

(65) Prior Publication Data

US 2023/0188946 A1    Jun. 15, 2023

(51) Int. Cl.
| | |
|---|---|
| *H04W 4/06* | (2009.01) |
| *H04L 12/18* | (2006.01) |
| *H04W 72/30* | (2023.01) |

(52) U.S. Cl.
CPC ............. *H04W 4/06* (2013.01); *H04W 72/30* (2023.01); *H04L 12/189* (2013.01)

(58) Field of Classification Search
CPC ...... H04L 12/189; H04W 4/06; H04W 72/23; H04W 72/30
See application file for complete search history.

(56) References Cited

U.S. PATENT DOCUMENTS

| | | | | |
|---|---|---|---|---|
| 9,386,557 | B2 * | 7/2016 | Tenny | ................. H04L 12/1881 |
| 9,538,518 | B2 * | 1/2017 | Seo | ........................ H04L 5/0053 |
| 2009/0047942 | A1 * | 2/2009 | Cao | ..................... H04L 12/1881 |
| | | | | 455/422.1 |
| 2011/0026522 | A1 * | 2/2011 | Hsu | ........................ H04L 65/611 |
| | | | | 370/390 |
| 2016/0338011 | A1 * | 11/2016 | Mizusawa | ............. H04W 72/23 |
| 2017/0290014 | A1 * | 10/2017 | Kim | .......................... B60S 5/00 |

(Continued)

*Primary Examiner* — Marcus Smith
*Assistant Examiner* — Kai Chang
(74) *Attorney, Agent, or Firm* — Holland & Hart LLP

(57) ABSTRACT

Methods, systems, and devices for wireless communications are described. Generally, a base station may transmit system information indicating multiple multicast-broadcast network areas, and may further provide configuration information for each multicast-broadcast network area indicating a location of multicast scheduling information (MSI). The MSI may include an indication of frequency resources on which to receive broadcast or multicast services. The MSI may indicate specific services for an multicast-broadcast network area that are provided via the different frequency resources (for example, different cells, carriers, channels, among other examples). In some examples, the base station may schedule broadcast or multicast services across frequency resources via semi-persistent scheduling. The MSI may indicate a redundancy version configuration (for example, time and frequency patterns for combined redundancy version broadcast transmissions).

24 Claims, 18 Drawing Sheets

(56) References Cited

U.S. PATENT DOCUMENTS

| | | | |
|---|---|---|---|
| 2019/0090103 A1* | 3/2019 | Panchal | H04W 4/203 |
| 2019/0158348 A1* | 5/2019 | Liou | H04L 41/0816 |
| 2020/0044776 A1* | 2/2020 | Guan | H04W 72/04 |
| 2020/0084787 A1* | 3/2020 | Hao | H04B 7/0456 |
| 2021/0212025 A1* | 7/2021 | Selvanesan | H04W 76/14 |
| 2021/0243706 A1* | 8/2021 | Liu | H04L 5/0007 |
| 2022/0167245 A1* | 5/2022 | Pilz | H04W 40/24 |
| 2023/0051095 A1* | 2/2023 | Wei | H04W 48/14 |
| 2023/0107283 A1* | 4/2023 | Park | H04W 48/08 |
| | | | 370/329 |
| 2023/0156434 A1* | 5/2023 | Mohammed Mikaeil | |
| | | | H04W 76/40 |
| | | | 370/329 |
| 2023/0209313 A1* | 6/2023 | Chin | H04W 4/06 |
| | | | 370/329 |
| 2023/0276474 A1* | 8/2023 | Mohammad Soleymani | |
| | | | H04W 72/40 |
| | | | 370/329 |

* cited by examiner 115-c 105-b

SI

305

Control Signaling

310

Configuration Information

315

MSI

320

Broadcast/Multicast Service

325

300

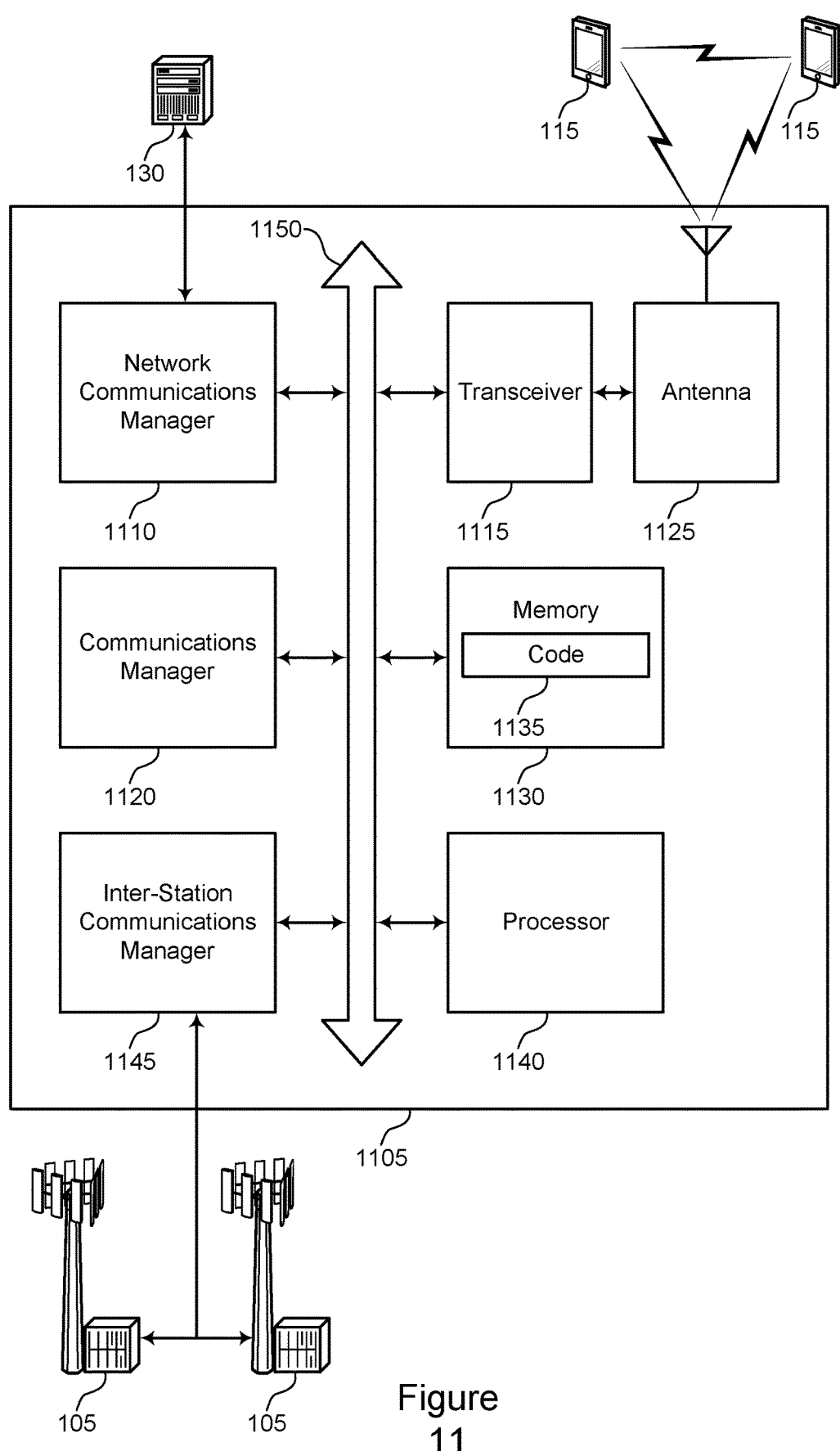
Figure
11

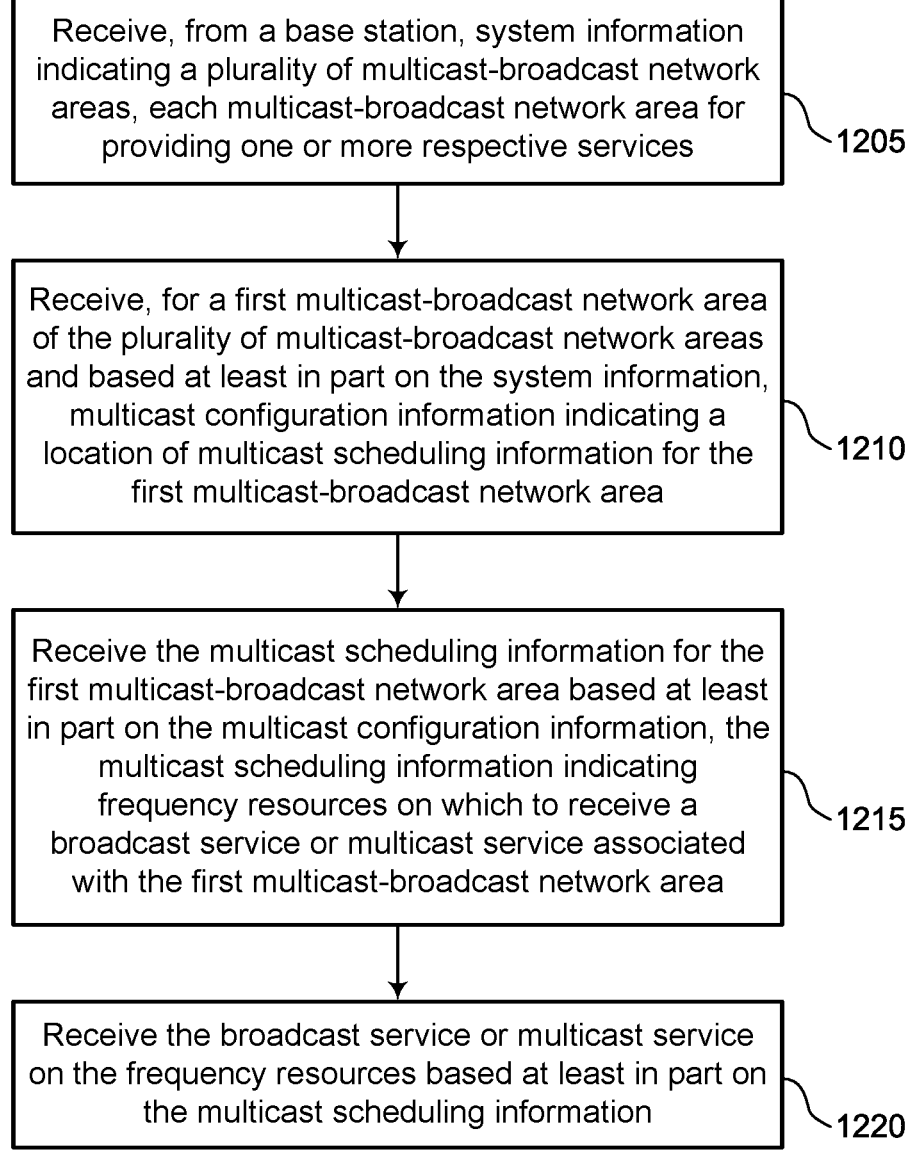

Receive, from a base station, system information indicating a plurality of multicast-broadcast network areas, each multicast-broadcast network area for providing one or more respective services

1205

Receive, for a first multicast-broadcast network area of the plurality of multicast-broadcast network areas and based at least in part on the system information, multicast configuration information indicating a location of multicast scheduling information for the first multicast-broadcast network area

1210

Receive the multicast scheduling information for the first multicast-broadcast network area based at least in part on the multicast configuration information, the multicast scheduling information indicating frequency resources on which to receive a broadcast service or multicast service associated with the first multicast-broadcast network area

1215

Receive the broadcast service or multicast service on the frequency resources based at least in part on the multicast scheduling information

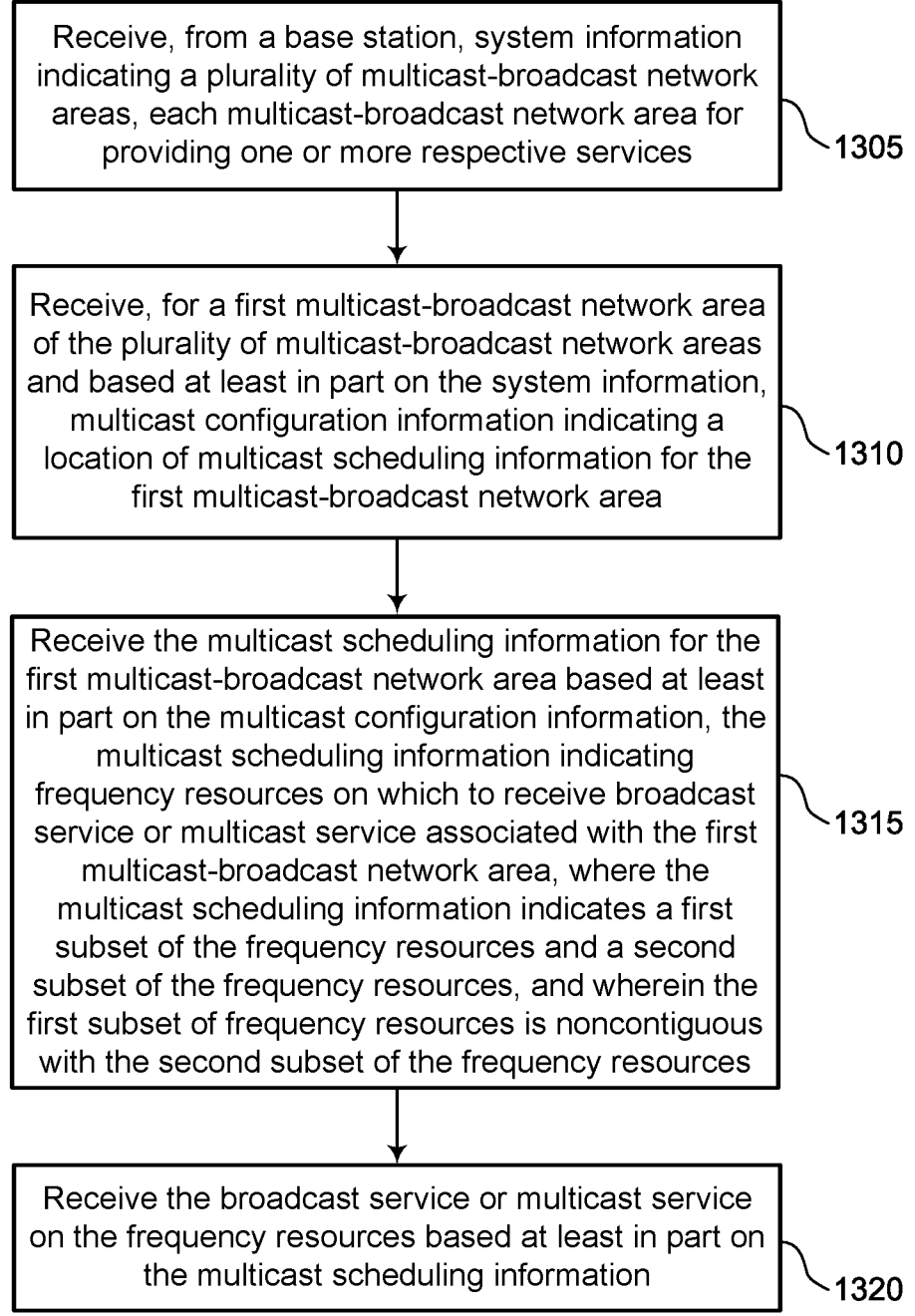

Receive, from a base station, system information indicating a plurality of multicast-broadcast network areas, each multicast-broadcast network area for providing one or more respective services

1305

Receive, for a first multicast-broadcast network area of the plurality of multicast-broadcast network areas and based at least in part on the system information, multicast configuration information indicating a location of multicast scheduling information for the first multicast-broadcast network area

1310

Receive the multicast scheduling information for the first multicast-broadcast network area based at least in part on the multicast configuration information, the multicast scheduling information indicating frequency resources on which to receive broadcast service or multicast service associated with the first multicast-broadcast network area, where the multicast scheduling information indicates a first subset of the frequency resources and a second subset of the frequency resources, and wherein the first subset of frequency resources is noncontiguous with the second subset of the frequency resources

1315

Receive the broadcast service or multicast service on the frequency resources based at least in part on the multicast scheduling information

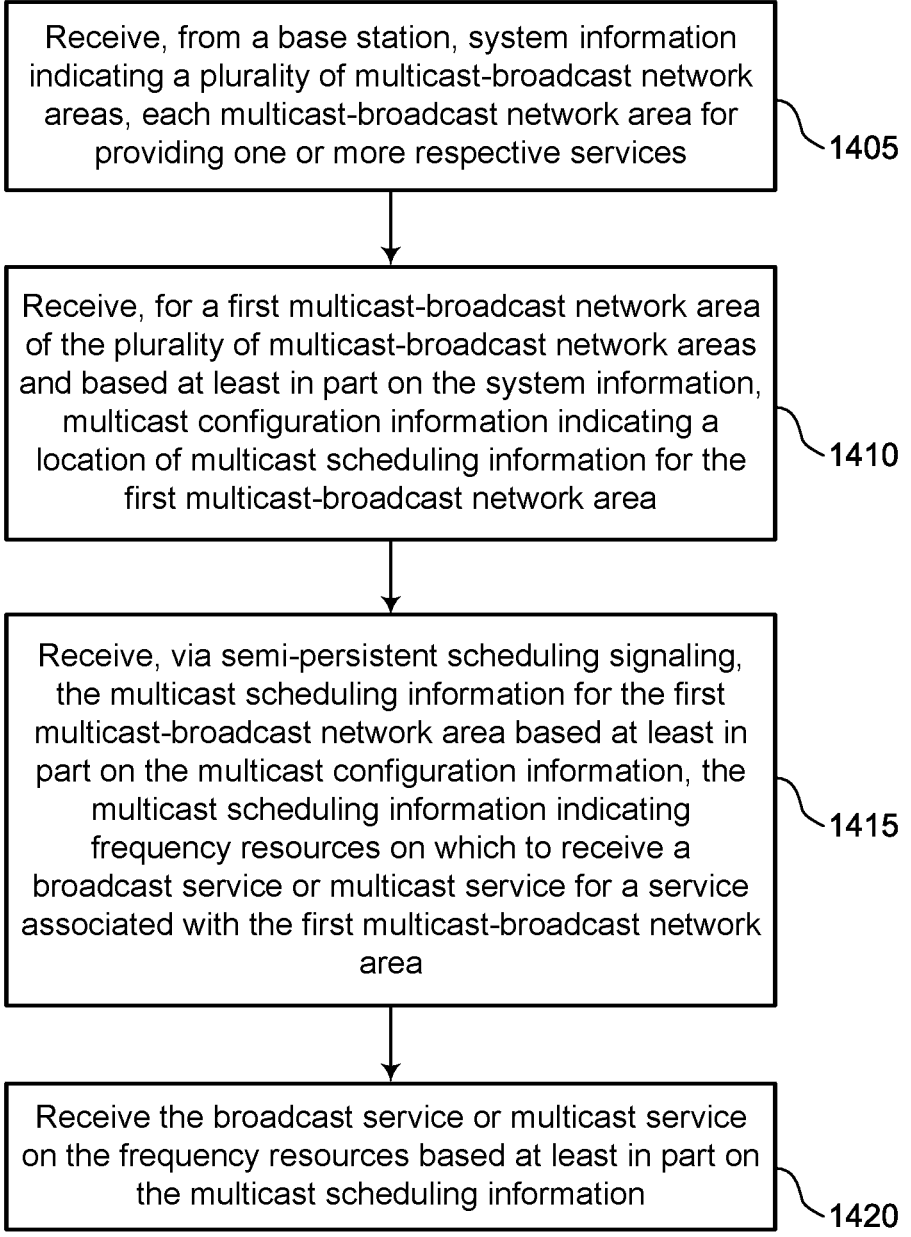

Receive, from a base station, system information indicating a plurality of multicast-broadcast network areas, each multicast-broadcast network area for providing one or more respective services

1405

Receive, for a first multicast-broadcast network area of the plurality of multicast-broadcast network areas and based at least in part on the system information, multicast configuration information indicating a location of multicast scheduling information for the first multicast-broadcast network area

1410

Receive, via semi-persistent scheduling signaling, the multicast scheduling information for the first multicast-broadcast network area based at least in part on the multicast configuration information, the multicast scheduling information indicating frequency resources on which to receive a broadcast service or multicast service for a service associated with the first multicast-broadcast network area

1415

Receive the broadcast service or multicast service on the frequency resources based at least in part on the multicast scheduling information

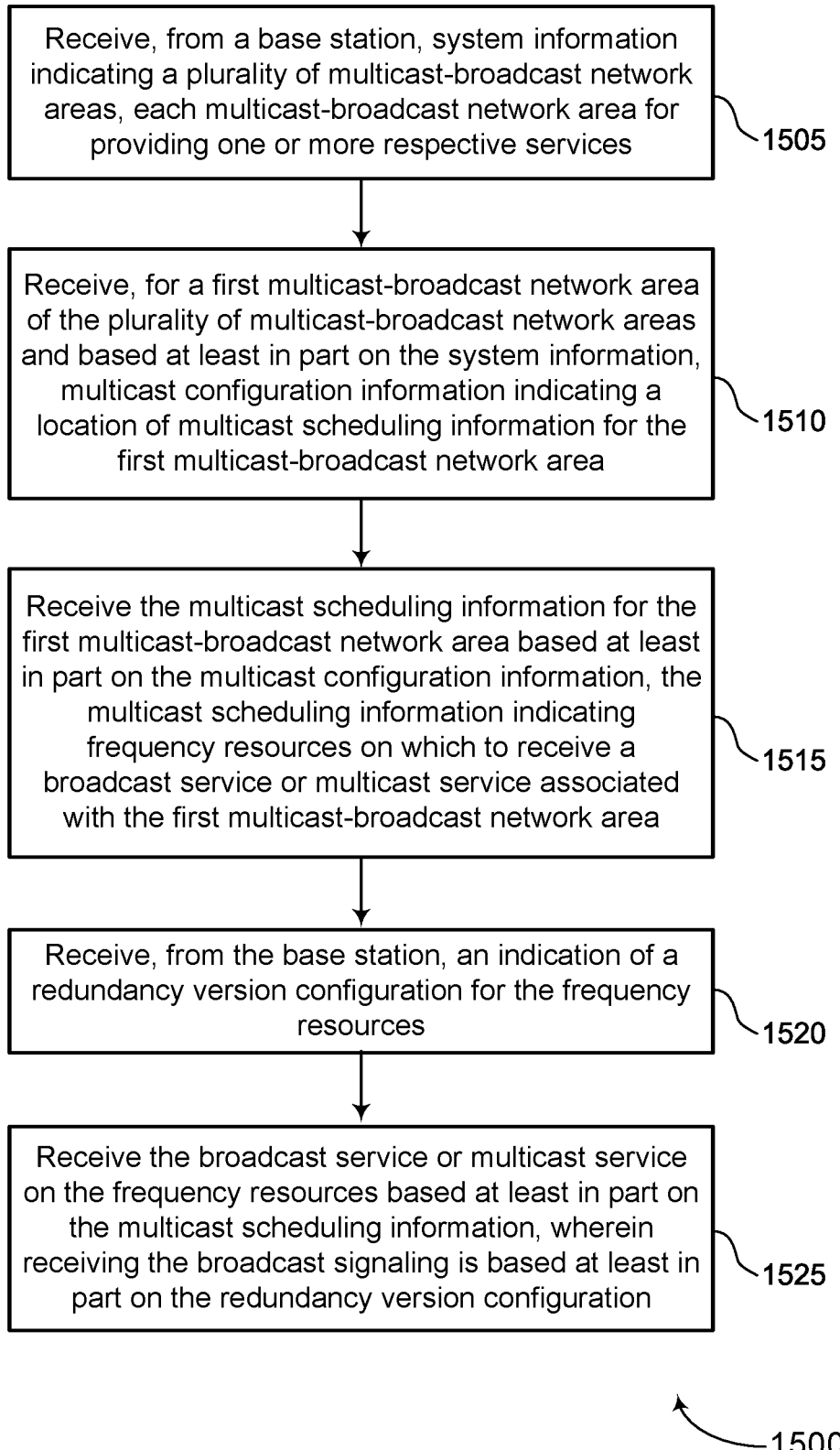

Receive, from a base station, system information indicating a plurality of multicast-broadcast network areas, each multicast-broadcast network area for providing one or more respective services

1505

Receive, for a first multicast-broadcast network area of the plurality of multicast-broadcast network areas and based at least in part on the system information, multicast configuration information indicating a location of multicast scheduling information for the first multicast-broadcast network area

1510

Receive the multicast scheduling information for the first multicast-broadcast network area based at least in part on the multicast configuration information, the multicast scheduling information indicating frequency resources on which to receive a broadcast service or multicast service associated with the first multicast-broadcast network area

1515

Receive, from the base station, an indication of a redundancy version configuration for the frequency resources

1520

Receive the broadcast service or multicast service on the frequency resources based at least in part on the multicast scheduling information, wherein receiving the broadcast signaling is based at least in part on the redundancy version configuration

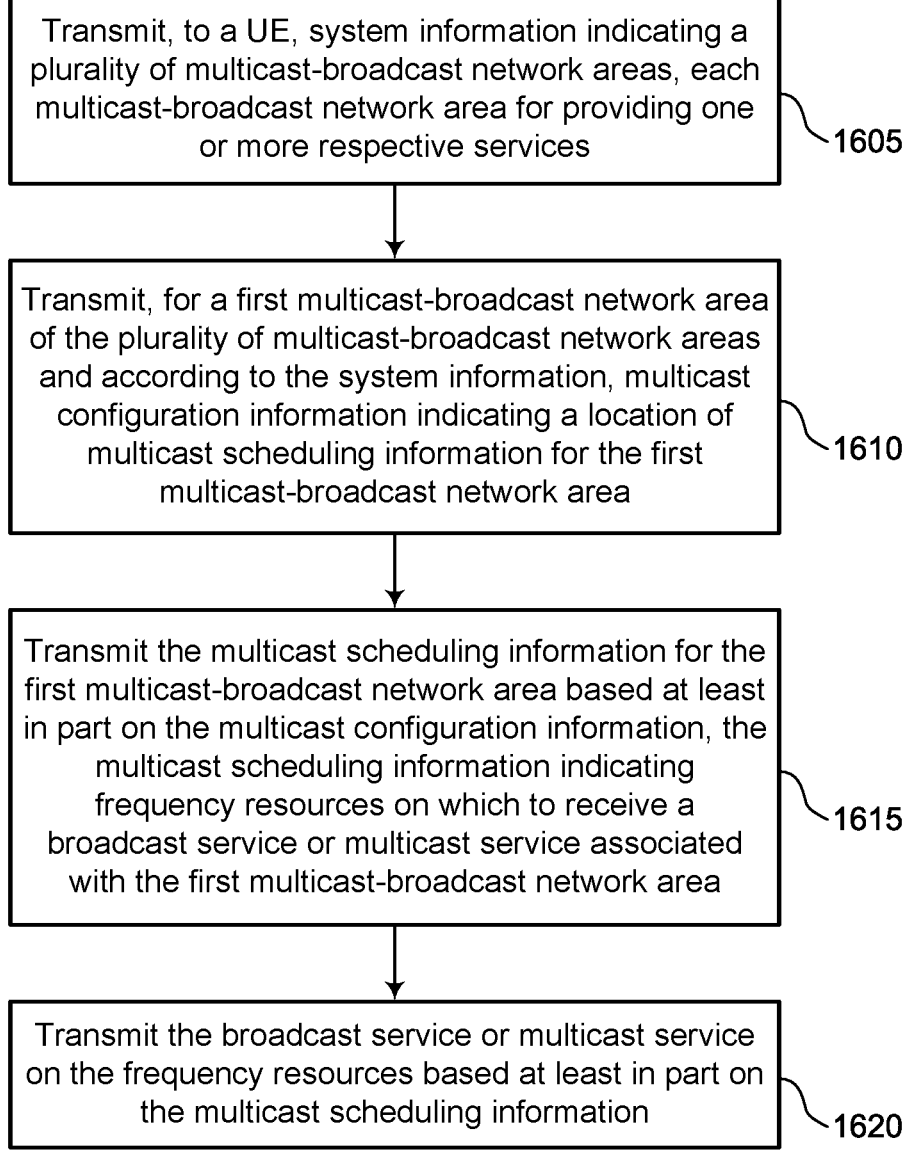

Transmit, to a UE, system information indicating a plurality of multicast-broadcast network areas, each multicast-broadcast network area for providing one or more respective services

1605

Transmit, for a first multicast-broadcast network area of the plurality of multicast-broadcast network areas and according to the system information, multicast configuration information indicating a location of multicast scheduling information for the first multicast-broadcast network area

1610

Transmit the multicast scheduling information for the first multicast-broadcast network area based at least in part on the multicast configuration information, the multicast scheduling information indicating frequency resources on which to receive a broadcast service or multicast service associated with the first multicast-broadcast network area

1615

Transmit the broadcast service or multicast service on the frequency resources based at least in part on the multicast scheduling information

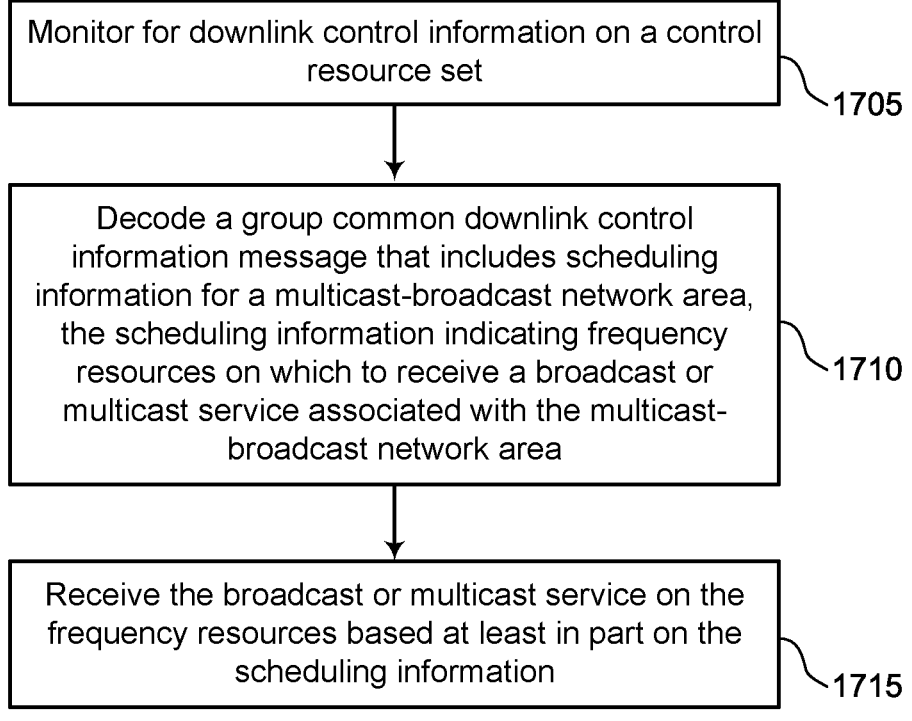

Monitor for downlink control information on a control resource set

1705

Decode a group common downlink control information message that includes scheduling information for a multicast-broadcast network area, the scheduling information indicating frequency resources on which to receive a broadcast or multicast service associated with the multicast-broadcast network area

1710

Receive the broadcast or multicast service on the frequency resources based at least in part on the scheduling information

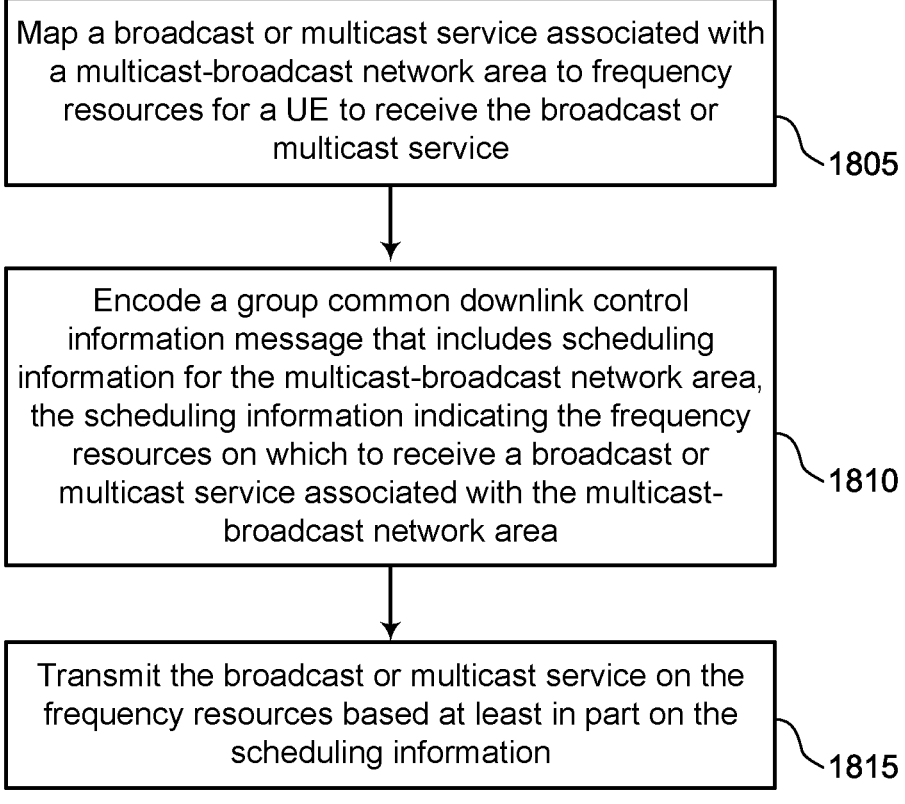

Map a broadcast or multicast service associated with a multicast-broadcast network area to frequency resources for a UE to receive the broadcast or multicast service

1805

Encode a group common downlink control information message that includes scheduling information for the multicast-broadcast network area, the scheduling information indicating the frequency resources on which to receive a broadcast or multicast service associated with the multicast-broadcast network area

1810

Transmit the broadcast or multicast service on the frequency resources based at least in part on the scheduling information

CONFIGURATION OF MULTIPLE SETS OF FREQUENCY RESOURCES FOR BROADCAST AND MULTICAST COMMUNICATIONS

TECHNICAL FIELD

The following relates to wireless communications, including configuration of multiple sets of frequency resources for broadcast and multicast communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a base station may communicate with a UE via broadcast services or multicast services (for example, in a multicast-broadcast network area). The base station may configure resources on which the UE is to receive the broadcast services or the multicast services. For example, the base station may transmit system information including a list of areas, such as multicast-broadcast single-frequency network (MBSFN) areas. The base station may also transmit multicast channel (MCCH) configuration information for each MBSFN area, which may indicate a location of multicast scheduling information (MSI). The MSI may include time resources during which the UE may receive the broadcast services or multicast services for a particular cell (such as, the MSI may be determined to be for a particular cell/frequency range). Some MBSFN deployments are not configured for carrier aggregation, channel bonding, or other related aspects, or may be limited to an exclusive use of a single contiguous segment of frequency resources.

SUMMARY

The systems, methods and devices of this disclosure each have several innovative aspects, no single one of which is solely responsible for the desirable attributes disclosure herein.

One innovative aspect of the subject matter described in this disclosure can be implemented in a method for wireless communication. The method may include receiving, from a base station, system information indicating a set of multiple multicast-broadcast network areas, each multicast-broadcast network area for providing one or more respective services, receiving, for a first multicast-broadcast network area of the set of multiple multicast-broadcast network areas and based on the system information, multicast configuration information indicating a location of multicast scheduling information for the first multicast-broadcast network area, receiving the multicast scheduling information for the first multicast-broadcast network area based on the multicast configuration information, the multicast scheduling information indicating frequency resources on which to receive a broadcast or multicast service associated with the first multicast-broadcast network area, and receiving the broadcast or multicast service on the frequency resources based on the multicast scheduling information.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to receive, from a base station, system information indicating a set of multiple multicast-broadcast network areas, each multicast-broadcast network area for providing one or more respective services, receive, for a first multicast-broadcast network area of the set of multiple multicast-broadcast network areas and based on the system information, multicast configuration information indicating a location of multicast scheduling information for the first multicast-broadcast network area, receive the multicast scheduling information for the first multicast-broadcast network area based on the multicast configuration information, the multicast scheduling information indicating frequency resources on which to receive a broadcast or multicast service associated with the first multicast-broadcast network area, and receive the broadcast or multicast service on the frequency resources based on the multicast scheduling information.

Another innovative aspect of the subject matter described in this disclosure can be implemented in an apparatus for wireless communications at a UE. The apparatus may include means for receiving, from a base station, system information indicating a set of multiple multicast-broadcast network areas, each multicast-broadcast network area for providing one or more respective services, means for receiving, for a first multicast-broadcast network area of the set of multiple multicast-broadcast network areas and based on the system information, multicast configuration information indicating a location of multicast scheduling information for the first multicast-broadcast network area, means for receiving the multicast scheduling information for the first multicast-broadcast network area based on the multicast configuration information, the multicast scheduling information indicating frequency resources on which to receive a broadcast or multicast service associated with the first multicast-broadcast network area, and means for receiving the broadcast or multicast service on the frequency resources based on the multicast scheduling information.

Another innovative aspect of the subject matter described in this disclosure can be implemented in a non-transitory computer-readable medium storing code for wireless communications at a UE. The code may include instructions executable by a processor to receive, from a base station, system information indicating a set of multiple multicast-broadcast network areas, each multicast-broadcast network area for providing one or more respective services, receive, for a first multicast-broadcast network area of the set of multiple multicast-broadcast network areas and based on the system information, multicast configuration information indicating a location of multicast scheduling information for the first multicast-broadcast network area, receive the multicast scheduling information for the first multicast-broadcast network area based on the multicast configuration information, the multicast scheduling information indicating frequency resources on which to receive a broadcast or multicast service associated with the first multicast-broadcast network area, and receive the broadcast or multicast service on the frequency resources based on the multicast scheduling information.

Another innovative aspect of the subject matter described in this disclosure can be implemented in a method of wireless communications at a base station. The method may include transmitting, to a UE, system information indicating a set of multiple multicast-broadcast network areas, each multicast-broadcast network area for providing one or more respective services, transmitting, for a first multicast-broadcast network area of the set of multiple multicast-broadcast network areas and according to the system information, multicast configuration information indicating a location of multicast scheduling information for the first multicast-broadcast network area, transmitting the multicast scheduling information for the first multicast-broadcast network area based on the multicast configuration information, the multicast scheduling information indicating frequency resources on which to receive a broadcast or multicast service associated with the first multicast-broadcast network area, and transmitting the broadcast or multicast service on the frequency resources based on the multicast scheduling information.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, to a UE, system information indicating a set of multiple multicast-broadcast network areas, each multicast-broadcast network area for providing one or more respective services, transmit, for a first multicast-broadcast network area of the set of multiple multicast-broadcast network areas and according to the system information, multicast configuration information indicating a location of multicast scheduling information for the first multicast-broadcast network area, transmit the multicast scheduling information for the first multicast-broadcast network area based on the multicast configuration information, the multicast scheduling information indicating frequency resources on which to receive a broadcast or multicast service associated with the first multicast-broadcast network area, and transmit the broadcast or multicast service on the frequency resources based on the multicast scheduling information.

Another innovative aspect of the subject matter described in this disclosure can be implemented in an apparatus for wireless communications at a base station. The apparatus may include means for transmitting, to a UE, system information indicating a set of multiple multicast-broadcast network areas, each multicast-broadcast network area for providing one or more respective services, means for transmitting, for a first multicast-broadcast network area of the set of multiple multicast-broadcast network areas and according to the system information, multicast configuration information indicating a location of multicast scheduling information for the first multicast-broadcast network area, means for transmitting the multicast scheduling information for the first multicast-broadcast network area based on the multicast configuration information, the multicast scheduling information indicating frequency resources on which to receive a broadcast or multicast service associated with the first multicast-broadcast network area, and means for transmitting the broadcast or multicast service on the frequency resources based on the multicast scheduling information.

Another innovative aspect of the subject matter described in this disclosure can be implemented in a non-transitory computer-readable medium storing code for wireless communications at a base station. The code may include instructions executable by a processor to transmit, to a UE, system information indicating a set of multiple multicast-broadcast network areas, each multicast-broadcast network area for providing one or more respective services, transmit, for a first multicast-broadcast network area of the set of multiple multicast-broadcast network areas and according to the system information, multicast configuration information indicating a location of multicast scheduling information for the first multicast-broadcast network area, transmit the multicast scheduling information for the first multicast-broadcast network area based on the multicast configuration information, the multicast scheduling information indicating frequency resources on which to receive a broadcast or multicast service associated with the first multicast-broadcast network area, and transmit the broadcast or multicast service on the frequency resources based on the multicast scheduling information.

Another innovative aspect of the subject matter described in this disclosure can be implemented in a method for wireless communications at a UE. The method includes monitoring for downlink control information on a control resource set, decoding a group common downlink control information message that includes scheduling information for a multicast-broadcast network area, the scheduling information indicating frequency resources on which to receive a broadcast or multicast service associated with the multicast-broadcast network area, and receiving the broadcast or multicast service on the frequency resources based on the scheduling information.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to monitor for downlink control information on a control resource set, decode a group common downlink control information message that includes scheduling information for a multicast-broadcast network area, the scheduling information indicating frequency resources on which to receive a broadcast or multicast service associated with the multicast-broadcast network area, and receive the broadcast or multicast service on the frequency resources based on the scheduling information.

Another innovative aspect of the subject matter described in this disclosure can be implemented in an apparatus for wireless communications at a UE. The apparatus may include means for monitoring for downlink control information on a control resource set, means for decoding a group common downlink control information message that includes scheduling information for a multicast-broadcast network area, the scheduling information indicating frequency resources on which to receive a broadcast or multicast service associated with the multicast-broadcast network area, and means for receiving the broadcast or multicast service on the frequency resources based on the scheduling information.

Another innovative aspect of the subject matter described in this disclosure can be implemented in a non-transitory computer-readable medium storing code for wireless communications at a UE. The code may include instructions executable by a processor to monitor for downlink control information on a control resource set, decode a group common downlink control information message that includes scheduling information for a multicast-broadcast network area, the scheduling information indicating frequency resources on which to receive a broadcast or multicast service associated with the multicast-broadcast network area, and receive the broadcast or multicast service on the frequency resources based on the scheduling information.

Another innovative aspect of the subject matter described in this disclosure can be implemented in a method for wireless communications at a base station. The method includes mapping a broadcast or multicast service associated with a multicast-broadcast network area to frequency resources for a UE to receive the broadcast or multicast service, encoding a group common downlink control information message that includes scheduling information for the multicast-broadcast network area, the scheduling information indicating the frequency resources on which to receive a broadcast or multicast service associated with the multicast-broadcast network area, and transmitting the broadcast or multicast service on the frequency resources based on the scheduling information.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to map a broadcast or multicast service associated with a multicast-broadcast network area to frequency resources for a UE to receive the broadcast or multicast service, encode a group common downlink control information message that includes scheduling information for the multicast-broadcast network area, the scheduling information indicating the frequency resources on which to receive a broadcast or multicast service associated with the multicast-broadcast network area, and transmit the broadcast or multicast service on the frequency resources based on the scheduling information.

Another innovative aspect of the subject matter described in this disclosure can be implemented in an apparatus for wireless communications at a base station. The apparatus may include means for mapping a broadcast or multicast service associated with a multicast-broadcast network area to frequency resources for a UE to receive the broadcast or multicast service, means for encoding a group common downlink control information message that includes scheduling information for the multicast-broadcast network area, the scheduling information indicating the frequency resources on which to receive a broadcast or multicast service associated with the multicast-broadcast network area, and means for transmitting the broadcast or multicast service on the frequency resources based on the scheduling information.

Another innovative aspect of the subject matter described in this disclosure can be implemented in a non-transitory computer-readable medium storing code for wireless communications at a base station. The code may include instructions executable by a processor to map a broadcast or multicast service associated with a multicast-broadcast network area to frequency resources for a UE to receive the broadcast or multicast service, encode a group common downlink control information message that includes scheduling information for the multicast-broadcast network area, the scheduling information indicating the frequency resources on which to receive a broadcast or multicast service associated with the multicast-broadcast network area, and transmit the broadcast or multicast service on the frequency resources based on the scheduling information.

BRIEF DESCRIPTION OF THE DRAWINGS

FIG. 11 shows a diagram of a system including a device that supports configuration of multiple sets of frequency resources for broadcast and multicast communications in accordance with aspects of the present disclosure.

FIGS. 12-18 show flowcharts illustrating methods that support configuration of multiple sets of frequency resources for broadcast and multicast communications in accordance with aspects of the present disclosure.

DETAILED DESCRIPTION

Figure 1:
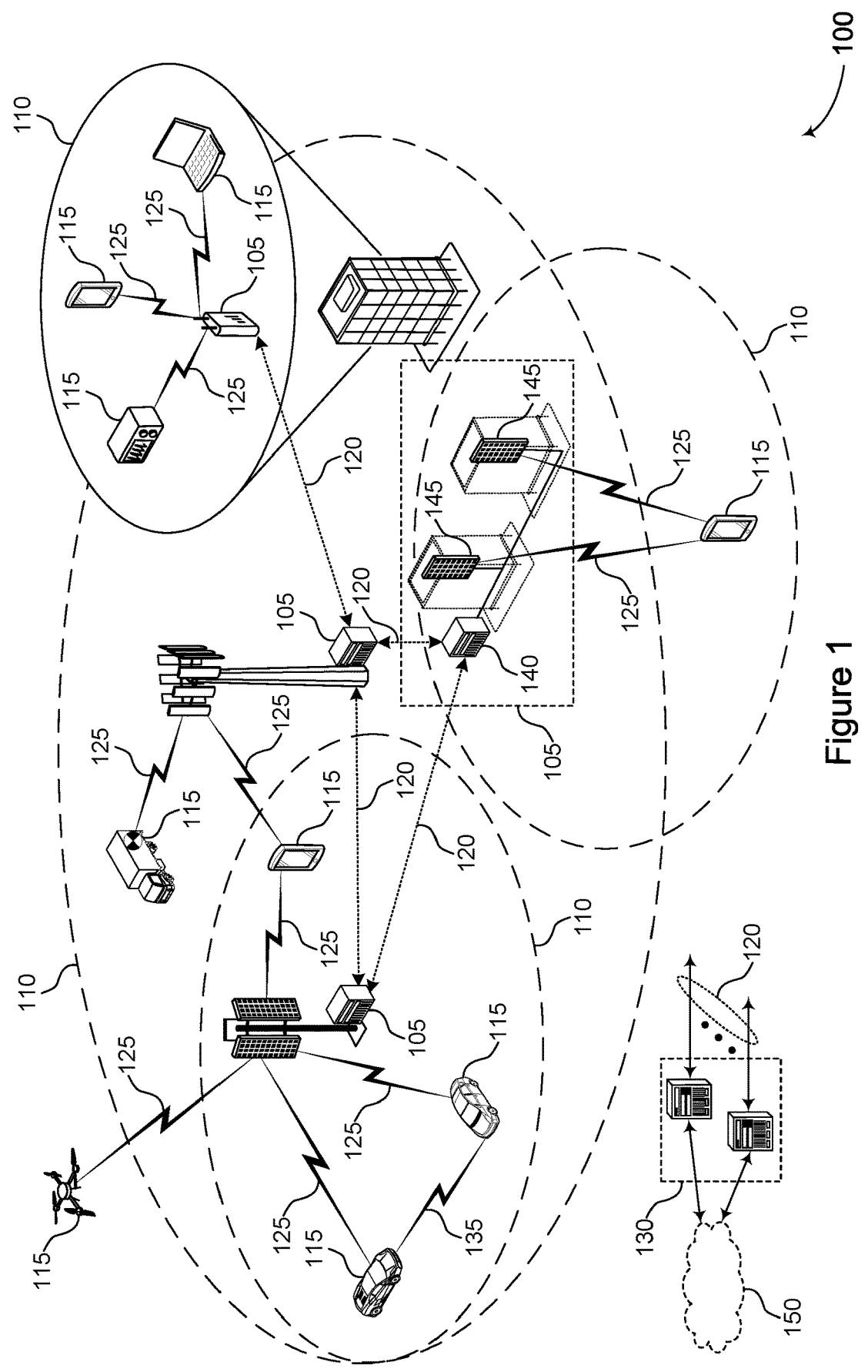
FIG. 1 illustrates an example of a wireless communications system that supports configuration of multiple sets of frequency resources for broadcast and multicast communications in accordance with aspects of the present disclosure.

In some wireless communications systems, for multicast-broadcast single-frequency networks (MBSFNs), a base station may provide MBSFN services to multiple devices (such as user equipments (UEs) located in multiple MBSFN areas). The base station may configure a UE with time resources for one or more of the MBSFN services provided by one or more of the MBSFN areas. Specifically, the base station may transmit system information including a list (or other form of identifications) of the MBSFN areas. The base station may also transmit multicast channel (MCCH) configuration information for each MBSFN area, which may indicate a location of multicast scheduling information (MSI) for the respective MBSFN area. For example, the base station may transmit the MSI according to location information (for example, on the time and frequency resources) indicated in the MCCH. The base station may transmit the MSI in one or more semi-persistent scheduling (SPS) instances. The MSI may indicate time resources during which the UE may receive broadcast services or multicast services from a particular cell associated with a range of frequency resources for an MBSFN area (in some examples, the UE may be configured to determine that the MSI is for the particular cell).

Some MBSFN deployments do not support carrier aggregation or channel bonding, among other examples of more advanced features. For example, MBSFN services provided for an MBSFN area may be provided for only a single segment of contiguous frequency resources (for example, instead of supporting multiple non-contiguous segments of frequency resources), which may result in unutilized resources, inefficient use of available system resources, increased system latency, and decreased throughput of broadcast services or multicast services, among other issues. If an operator were to be allocated discontinuous segments of frequency spectrum, such an allocation would allow for more efficient use of available system resources, as well as increased flexibility in broadcast or multicast services. However, in such examples base stations in wireless communications systems that support only configuration of time resources during which a UE may receive broadcast services or multicast services, from a particular cell associated with a range of frequency resources, do not provide signaling for indicating multiple non-contiguous sets of frequency resources (for example, to support carrier aggregation or channel bonding) via MSI or other signaling.

Various aspects generally relate to providing broadcast services or multicast services, and more specifically to transmitting broadcast or multicast services across multiple sets of frequency resources, such as noncontiguous sets of frequency resources. A base station may transmit MSI indicating frequency resources (for example, multiple sets of frequency resources such as multiple cells, multiple carriers, or multiple channels, among other examples) on which a UE is to receive the broadcast or multicast services. The base station may transmit system information indicating one or more MBSFN areas that provide the broadcast or multicast services, and may further transmit a respective MCCH for each MBSFN area indicating a location of the MSI for the MBSFN area. The MSI may also indicate the respective broadcast or multicast services that are provided for UEs in the respective MBSFN area via the sets of frequency resources. The MSI may further indicate a redundancy version configuration (for example, time and frequency patterns for combined redundancy version broadcast or multicast transmissions). In some examples, the base station may schedule the broadcast services or multicast services across the sets of frequency resources via semi-persistent scheduling. The base station may subsequently transmit a group-common (GC) downlink control information (DCI), which may include the MSI. The base station may schedule the broadcast or multicast services to satisfy a threshold delay between the GC-DCI and the scheduled broadcast or multicast services.

In some aspects, the semi-persistent scheduling signaling may be provided via semi-persistent scheduling occasions that are allocated for a first type of UEs (for example, a first set of semi-persistent scheduling occasions configuring time resources for the first type of UEs that only support allocations of time resources for broadcast or multicast services), and SPS occasions that are allocated for a second type of UEs (for example, a second set of semi-persistent scheduling occasions configuring time and frequency resources for the second type of UEs that support allocations of both time and frequency resources for broadcast or multicast services).

Particular aspects of the subject matter described in this disclosure may be implemented to realize one or more of the following potential advantages. The techniques employed by the described communication devices may provide improved throughput of broadcast or multicast services resulting from more efficient use of available resources. For example, operations performed by the described communication devices may enable respective allocations of noncontiguous segments of frequency resources to respective broadcasting operators for carrier aggregation and channel bonding. This will enable a diverse use of frequency resources across multiple operators in an MBSFN area (instead of allocating contiguous segments of frequency resources to respective operators, such that some unneeded resources in a segment of frequency resources for a given operator remain unused), which may in turn result in a more efficient use of available resources on which the various operators may provide different respective multicast or broadcast services to UEs in a given MBSFN area. Additionally, or alternatively, techniques described herein may facilitate coexistence between different types of UEs. For example, configuration of occasions for MSI for a first type of UE that only support configuration of time resources for broadcast or multicast services and occasions for MSI for a second type of UE that supports configuration of both time and frequency resources for multicast services may enable backwards compatibility and support for various configurations of broadcast and multicast services without a negative impact on user experience (for example, regardless of whether a user is using a UE of the first type or a UE of the second type).

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to configuration of multiple sets of frequency resources for broadcast and multicast communications.

FIG. 1 illustrates an example of a wireless communications system 100 that supports configuration of multiple sets of frequency resources for broadcast and multicast communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit, to a UE 115, MSI indicating frequency resources (for example, multiple sets of frequency resources) on which to receive broadcast services or multicast services. The base station 105 may transmit system information indicating one or more MBSFN areas, and may further provide MCCH for each MBSFN area indicating a location of MSI. The MSI may include an indication of frequency resources on which to receive broadcast or multicast services. The MSI may indicate specific services for an MBSFN area that are provided via the different frequency resources (for example, different cells, carriers, channels, among other examples). In some examples, the base station 105 may schedule broadcasting or multicasting services across frequency resources via semi-persistent scheduling, and the semi-persistent scheduling signaling may include semi-persistent scheduling occasions that are allocated for a first type of UEs, such as legacy UEs, (for example, indicating time resources), and SPS occasions that are allocated for a second type of UEs, such as non-legacy UEs, (for example, indicating time and frequency resources). The MSI may indicate a redundancy version configuration (for example, time and frequency patterns for combined redundancy version broadcast transmissions). The base station 105 may configure a set of different redundancy version configurations (for example, time-frequency resource patterns), and may indicate (for example, via the MSI) one of the configured redundancy version configurations. The base station 105 may indicate the MSI via a group-common (GC) downlink control information (DCI), and the base station 105 may schedule multicast services or broadcasting services to satisfy a threshold delay between the GC-DCI and the scheduled multicast services.

Figure 2:
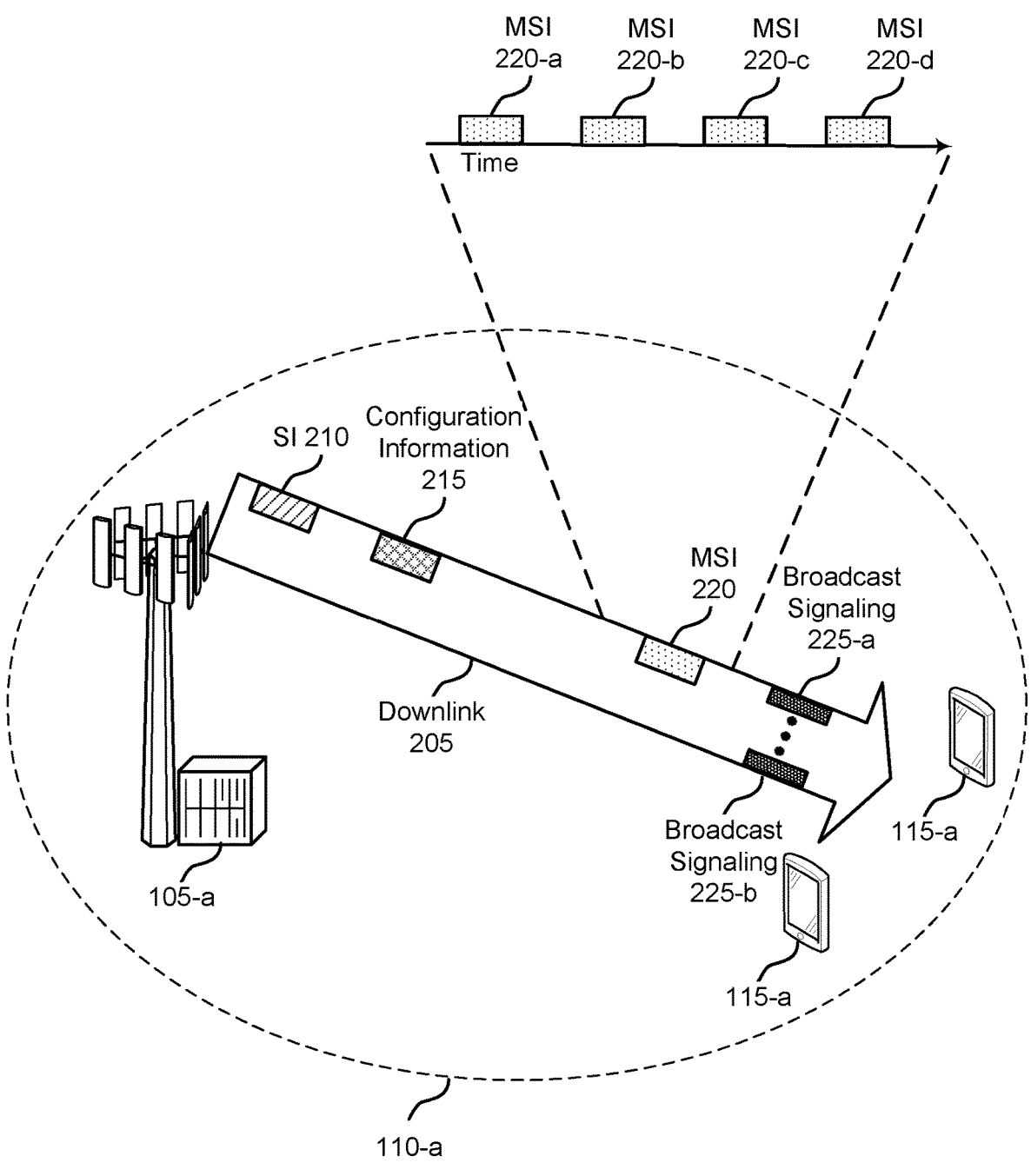
FIG. 2 illustrates an example of a wireless communications system that supports configuration of multiple sets of frequency resources for broadcast and multicast communications in accordance with aspects of the present disclosure.

FIG. 2 illustrates an example of a wireless communications system 200 that supports configuration of multiple sets of frequency resources for broadcast and multicast communications in accordance with aspects of the present disclosure. The wireless communications system 200 may include a base station 105-a, and one or more UEs 115 (for example, the UE 115-a and the UE 115-b). The base station 105-a may serve UEs 115 located within a coverage are 110-a. In some examples, the base station 105-a may communicate downlink signaling (for example, broadcast services or multicast services) via downlink 205.

In some examples, as described herein, the base station 105-a may provide multicast or broadcast services to one or more UEs 115-a in a multicast-broadcast network area (for example, an MBSFN area, which may partially or totally overlap with the coverage area 110-a). For instance, one or more operators may provide broadcasting services (for example, wide-area terrestrial broadcasting) to the UEs 115 within one or more coverage areas 110-a (for example, an MBSFN area). In such examples, the base station 105-a may transmit system information (SI) 210 to a UE 115 (for example, the UE 115-a). The SI 210 may be a system information block (SIB) (for example, systemInformaion-BlockType13-r9), and may include information about one or more MBSFN areas. For instance, the SI 210 may include a list of MBSFN areas (for example, MBSFN-AreaInfoList-r9). Each of the MBSFN areas may be associated with configuration information 215 for a particular MBSFN area. For instance, the base station 105-a may transmit multicast configuration information 215 (for example, via a multicast control channel (MCCH)) indicating a location of multicast scheduling information (MSI) 220 for each respective MBSFN area. The UE 115-a may identify MSI 220 for an MBSFN area (for example, associated with coverage area 110-a) based on the configuration information 215. For instance, the UE 115-a may select an MBSFN area (for example, from the list of MBSFN areas included in the SI 210) serving the geographic location at which the UE 115-a is located, and may receive the configuration information 215 that is associated with the selected MBSFN area.

In some examples of wireless communications systems, the MSI may indicate time resources on which to receive the service 225 (for example, broadcast services, or multicast services, among other examples). The configuration information 215 may configure a scheduling duration for the MSI 220. In some examples, for multimedia broadcast multicast service (MBMS) user date, which may be carried by a multicast traffic channel (MTCH) logical channel, the base station 105-a may periodically provide multicast channel scheduling information (for example, MSI 220) at lower layers (for example, a MAC layer). The MSI may refer to time domain scheduling (for example, but not frequency domain scheduling). For instance, frequency domain scheduling and lower layer configuration information may be semi-statically configured. The UE 115-a may receive (for example, via the MSI 220) an indication of resources on which to receive services 225 (for example, broadcast services or multicast services), and may determine that the indication of time resources refers to a most recently configured set of frequency resources (for example, a particular cell, among other examples). The periodicity of the MSI may be configured and defined by the MCH scheduling duration, which may be indicated in the configuration information 215.

In some examples, if an operator is allocated a set of frequency resources (for example, a range of contiguous frequency resources), then the operator may schedule the services 225 for a duration (for example, via the MSI 220) for the set of frequency resources (for example, as configured periodically via the configuration information 215). However, some operators (for example, broadcast operators) may support channel bonding, carrier aggregation, among other examples. For example, an operator may be allocated discontinuous segments of frequency spectrum for broadcast or multicast services. In such examples, an indication of time resources in the MSI 220 may apply to a range of contiguous resources, only a portion of which are actually allocated to the operator. This may result in frequency resources that go unutilized (for example, allocated by the MSI 220 but not used by the operator for an MBSFN area), or the inability for an operator to allocate disparate segments of frequency resources for broadcast or multicast services. An MSI 220, in other different examples, that merely indicates time resources may not support broadcast or multicast services in a channel bonding or carrier aggregation scenario.

In some examples, as described herein, the base station 105-a may provide semi-static configuration associated with an MBSFN area identifier by indicating, to the UE 115-a, that at least some services within the MBSFN area are associated with more than one frequency resource (for example, more than one set of frequency resources, more than one cell, more than one carrier, more than one channels, among other examples). The base station 105-a may indicate frequency resources on which the UE 115-a may receive services 225 in an information element (for example, MBSFN-AreaInfo-r9). Such an information element may be included, for instance, in the MSI 220. In such examples, the base station 105-a may transmit SI 210, which may include the list of MBSFN areas. For the MBSFN area associated with the UE 115-a (for example, the MBSFN area associated with the coverage area 110-a), the UE 115-a may receive the multicast configuration information 215 (for example, an MCCH associated with the relevant MBSFN area from the list of MBSFN areas in the SI 210). The configuration information 215 may indicate a set of resources (for example, time resources, frequency resources, spatial resources, or any combination thereof) on which the UE 115-a is to receive the MSI 220. The base station 105-a may transmit the MSI 220 on the indicated resources. The UE 115-a may monitor for and receive the MSI 220 based at least in part on the configuration information 215. The MSI 220 may include the indication of frequency resources on which to receive the services 225. Such information (for example, of the frequency resources on which to receive the services 225) may include an indication of frequency domain identifies (for example, absolute radio-frequency channel number (ARFCNs)) of constituent carriers of a carrier aggregation or constituent channels of a channel bonding deployment. For instance, the MSI may indicate first frequency resources for services 225-a, and second frequency resources for services 225-b. The first frequency resources and the second frequency resources may be contiguous, or non-contiguous. For instance, the first frequency resources and second frequency resources may be first and second carriers, first and second channels, first and second bands, first and second bandwidth parts (BWPs), among other examples. The first and second carriers, channels, bands, BWPs, among other examples, may not be adjacent to each other in the frequency domain.

In some examples, the base station 105-a may configure the UE 115-a with candidate carrier aggregation configurations, channel bonding configurations, among other examples. The base station 105-a may indicate (for example, via the MSI 220, the configuration information 215, or both) the candidate configurations to the UE 115-a. AN MSI MAC entity (for example, at the UE 115-a) may choose one of the carrier aggregation configuration or a channel bonding configuration from the set of candidate configurations for a given service provided for the MBSFN area. In some examples, the base station 105-a may configure the candidate configurations such that each candidate configuration is associated with a different service provided for the MBSFN area. In such examples, the UE 115-a may select the candidate configurate for receiving services or multicast services 225 based on which service is being provided. In some examples, the UE 115-a may autonomously select one of the candidate configurations.

In some examples, time and frequency resources of the multicast configuration information 215 (for example, the MCCH), the MSI 220, or both, may be indicated semi-statically. For example, the base station 105-a may provide the MSI 220 (for example, a MAC entity that performs the service-level differentiation and scheduling) to the UE 115-a periodically. For instance, the base station 105-a may transmit MSI 220-a, MSI 220-b, MSI 220-c, and MSI 220-d over time. The base station 105-a may transmit the MSIs 220 over time on primary carriers (for example, MSIs 220 may be restricted to primary carriers in a carrier aggregation scenario). In some examples, the base station 105-a may transmit MSIs 220 over time on any carrier or carriers (for example, primary carriers, secondary carriers, among other examples). In some examples, the base station 105-a may transmit the configuration information 215 periodically (for example, on primary carriers, or on both primary carriers and secondary carriers).

The base station 105-a may schedule services or multicast services 225 in the time domain and the frequency domain. Such scheduling of services 225 in the frequency domain (for example, on first and second frequency resources that may or may not be contiguous) may support carrier aggregation, channel bonding, among other examples. The MSI 220 may schedule various services for the MBSFN area on the different frequency resources (for example, a first service for the MBSFN area may be scheduled on a first subset of frequency resources, which may or may not be contiguous, and a second service for the MBSFN area may be scheduled on a second subset of frequency resources, which may or may not be contiguous).

In some examples, the MSI itself may include an indication of a mapping between subsets of frequency resources and provided services. In some examples, the MSI may indicate a selection of previously configured candidate carriers for each respective service. For instance, the SI 210 or the configuration information 215 (for example, the MCCH) may indicate that for some services for the MBSFN area, the UE 115-a is to expect to receive the service on multiple carriers. For such services, the SI 210 or the configuration information 215 may list multiple candidate carriers (or, for example, channels, subsets of frequency resources, among other examples). In some examples, the SI 210 or the configuration information 215, or both, may indicate a list of candidate subsets of frequency resources (for example, carriers, channels, or subbands, among other examples) for each service, or a subset of services, provided for the MBSFN area. The MSI 220 may then select from among the candidate carriers for respective service. For instance, the SI 210, the configuration information 215, or both, may indicate a set of candidate carriers (for example, at least four carriers including Carrier 1, Carrier 2, Carrier 3, and Carrier 4). For a first service (for example, Service 1), the MSI 220 may indicate that Service 1 will be provided on Carrier 2 and Carrier 4. For a second service (for example, Service 2), the MSI 220 may indicate that Service 2 will be provided on Carrier 1 and Carrier 3. Thus, the MSI 220 may explicitly (for example, without previous configuration via the SI 210 or the configuration information 215) indicate a mapping between subsets of frequency resources and services, or may provide a selection of previously configured candidate carriers for specific services. For instance, system information (or other control signaling such as configuration information 215) may indicate a set of possible candidate configurations for carrier aggregation in an MBSFN area (for example, 16 possible candidate configurations). Each candidate configuration may be defined by a label, or may be associated with an index, among other examples. In such examples, the MSI 220 may include an indication of a label or an index value (for example, a 4-bit label for a service), which may indicate which of the candidate configurations the MSI 220 is choosing.

In some examples, some types of UEs 115 may be capable of receiving an MSI 220 that indicates both time resources and frequency resources, and other types of UEs 115 may support MSIs 220 that indicate time resources (for example, but not frequency resources). For instance, the UE 115-a may be a first type of UE 115 (for example, a 5G or NR UE), while the UE 115-b may be a second type of UE (for example, a legacy UE). The UE 115-a may support MSI signaling that indicates frequency resources for broadcast or multicast services, while the UE 115-a may support MSI signaling that indicates time resources for broadcast or multicast services. In such examples, the UE 115-b may access some services within the MBSFN area, but may not be able to interpret an MSI 220 that indicates time resources and frequency resources. However, the base station 105-a may provide MBSFN services to both the UE 115-a and the UE 115-b in the MBSFN area, and the wireless communications system 200 may support coexistence for the two types of UEs 115 as MAC scheduling entities for the MBSFN area.

To support such coexistence, the base station 105-a may schedule a timeline for transmitting MSIs 220 (for example, semi-statically). The UE 115-a may be capable of decoding a first subset of the MSIs 220 (for example, including an indication of frequency resources for receiving broadcast or multicast services) and the UE 115-b may be capable of decoding a second subset of the MSIs 220 (for example, including an indication of time resources for receiving broadcast or multicast services, but no indication of frequency resources for receiving broadcast or multicast services). In such examples, the base station 105-a may schedule the transmission of semi-persistent MSIs 220 such that a timeline of legacy MSIs 220 with holes or gaps for transmission of updated or new MSIs 220. For instance, the MSI 220-a and the MSI 220-c may be new or updated MSIs 220 including an indication of frequency resources for receiving broadcast or multicast services, while MSIs 220-b and MSI 220-d may be legacy MSIs 220. The UE 115-a may monitor for and receive MSI 220-*a*, MSI 220-*c*, or both, and may determine time and frequency resources on which to receive the services 225-*a* and the services 225-*b*. The UE 115-*b* may monitor for and receive MSI 220-*b*, MSI 220-*d*, or both, and may determine time resources on which to receive services 225. In some examples, the base station 105-*a* may indicate the location of MSIs 220 that correspond to a type of UE 115 (for example, in the configuration information 215). The UE 115-*a* may determine which MSIs 220 it will receive based on the indicated type of UE 115 corresponding to each MSI 220.

In some examples, the wireless communications system 200 may support various level combining (for example, MAC level or lower layer combining) across multiple frequency resources (for example, across multiple cells, carriers, frequency resources, channels, among other examples). IN such examples, the UE 115-*a* may employ HARQ redundancy version (RV) level combining across the frequency resources. For instance, the UE 115-*a* may receive services 225-*a* and services 225-*b* across different sets of frequency resources, and may combine different redundancy versions from across different cells, carriers, frequency resources, channels, among other examples (for example, such as examples in which cross component carrier interleaving is employed by the base station 105-*a* to transmit the services 225). The base station 105-*a* may indicate such deployments to the UE 115-*a*. For instance, the base station 105-*a* may indicate, to the UE 115-*a*, on which frequency resources different redundancy versions will be located. The UE 115-*a* may receive the downlink signaling, including the redundancy versions, across the various frequency resources indicated by the MSI 220, and may combine the broadcast services or multicast services according to the indication of the redundancy versions. The base station 105-*a* may provide the redundancy version configuration information in MBSFN area related information (for example, in the SI 210 or the configuration information 215), or in the MSI 220 (for example, at the service level). In some examples, the base station 105-*a* may communicate the redundancy version configuration information by indicating at least one of a set of candidate redundancy version configurations. For instance, the base station 105-*a* may configure the UE 115-*a* with a set of candidate redundancy version configurations, each candidate redundancy version configuration associated with an index value. The base station 105-*a* may then indicate (for example, in the MSI 220) one of the index values, and the UE 115-*a* may select the indexed redundancy version configuration.

The base station 105-*a* may communicate the redundancy version configuration information in one of various forms, such as a table or grid, that indicate time and frequency resource locations of various redundancy versions. Depending on a depth of an interleaving or redundancy version level combining, time and frequency resource patterns of the redundancy versions across different frequency resources may be different. Such patterns and depths may be defined in standards documents, or may be configured by the base station 105-*a*. Table 1 represents an example of across component carrier HARQ-combining (for example, for a time-interleaving solution).

TABLE 1

|  | Slot $N_1$ | Slot $N_2$ | Slot $N_3$ | Slot $N_4$ |
|---|---|---|---|---|
| CC1 | RV0 | RV2 | RV4 | RV6 |
| CC2 | RV1 | RV3 | RV5 | RV7 |

Such redundancy version configuration information may indicate a time resources (for example, a slot $N_i$), and a frequency resources (for example, a carrier such as CC1 or CC2) in which a redundancy version (RV) of a set of redundancy versions are located. Depending on a number of slots, and a number of carriers, the patterns (for example, redundancy version configurations) may be different, and each pattern may indicate a location in a resource grid that a redundancy version is located.

In some examples, the UE 115-*a* may decode received services 225 across multiple frequency resources using outer coding techniques. Outer coding schemes may be implemented in which two or more data blocks are encoded together according to the outer coding scheme (for example, an XOR with or without weighting factors, polynomial, or other coding operation) to generate an outer coded block that may be used as a repair code block to recover data blocks that may not be successfully decoded at the UE 115-*a*. In some examples, such an outer code may provide an erasure code that is a forward error correction (FEC) code under the assumption of bit (or packet in the outer coding application) erasures (rather than bit/packet errors), which transforms a message of k symbols into a longer message (code word) with n symbols such that the original message can be recovered from a subset of the n symbols. The fraction $r=k/n$ may be referred to as the code rate. The fraction k'/k, where k'denotes the number of symbols required for recovery, and may be referred to as reception efficiency. In some examples, the outer coding may be a maximum distance separable (MDS) code, where a subset up to k symbols of the n coded symbols of the code can be recovered.

In some examples, outer coded blocks may be transmitted with the set of data blocks such that PHY layer transmissions include both data and parity blocks. Examples in which one of the data blocks is not successfully decoded by UE 115-*a*, that data block can be recovered by reversing the outer coding process using a combination of a successfully received data block and the successfully received outer coded block. The inclusion of the outer coded block with the data blocks may increase the probability that the UE 115-*a* receives the data block. This use of outer coding may reduce the number of retransmissions at the base station 105-*a*, increasing network efficiency.

In some examples, the base station 105-*a* may communicate, to the UE 115-*a* outer coding configuration information across the frequency resources (for example, across multiple cells, carriers, frequency resources, bands, BWPs, among other examples). that may be combined for services 225. The base station 105-*a* may indicate whether (for example, and how) outer coding is to be employed across the multiple component carriers. In some examples, such information may be included in the configuration information 215, or MSI 220, or a combination thereof. The configuration information for the outer coding may include, for example, block code parameters (for example, number of codeword packets (N), number of parity packets (L), and number of data packets (K)). Further, in some examples, the configuration information may enable or disable outer coding, and enable or disable outer coding using packet segmentation. The configuration information may also include a mapping of the outer coding scheme to the various frequency resources utilized for services 225, for specific MBSFN services, among other examples. In some examples, for each packet or subpacket, a header may indicate whether this packet or subpacket contains data or parity bits. Further, in some examples, the configuration information may include parameters for a coding table that is to be used for communications.

In some examples, techniques described herein may be implemented for multicast services. In such examples, the base station 105-*a* may transmit, to the UE 115-*a*, a group-common (GC) downlink control information (DCI) message, which may take the place of the MSI 220. For instance, the UE 115-*a* may monitor for a DCI that may be scrambled with an identifier for group-common services (for example, a group radio network temporary identifier (G-RNTI)). The GC-DCI may employ cross-carrier scheduling. In such examples, the DCI format, DCI size, DCI design, among other examples, may support cross carrier scheduling for multicast services. For such multicast services, a single transport block (TB) may be transmitted, and may be mapped over a single carrier or across multiple carriers (for example, examples in which carrier aggregation is employed).

In some examples, a virtual carrier may be defined that includes multiple carriers, for the purposes of TB mapping. Such a virtual carrier may be defined in standards documents, may be configured or otherwise indicated by the base station 105-*a*, among other examples. The base station 105-*a* may transmit a repetition (for example, a redundancy version RV0) of a same TB on multiple carriers (for example, to improve reliability). In such examples, the base station 105-*a* may provide multicast services to the UE 115-*a* according to a threshold scheduling delay (for example, that is specific to multicast services). The threshold scheduling delay may be configured by the base station 105-*a*, indicated in standards documents, among other examples. The threshold scheduling delay may define an amount of time between the UE 115-*a* receiving the GC-PDCCH (for example, the GC-DCI) and the carrier aggregated multicast services. The base station 105-*a* may schedule the multicast services using the GC-DCI such that the amount of time between the GC-DCI and the scheduled multicast services is equal to or greater than the threshold scheduling delay.

In some examples in which combining (for example, MAC layer combining and lower layer combining) is supported for multiple frequency resources (for example, multiple component carriers), wireless communications system 200 may support enhanced HARQ buffer management. For example, the UE 115-*a* may perform HARQ buffer management across component carriers (for example, instead of on an individual component carrier basis). The HARQ buffer management across component carriers may be configured b the base station 105-*a*, defined in standards documents, among other examples. If HARQ combining is supported across different component carriers, we may need to enhance HARQ buffer management from a per-component carrier basis, to an across-component carrier basis.

Figure 3:
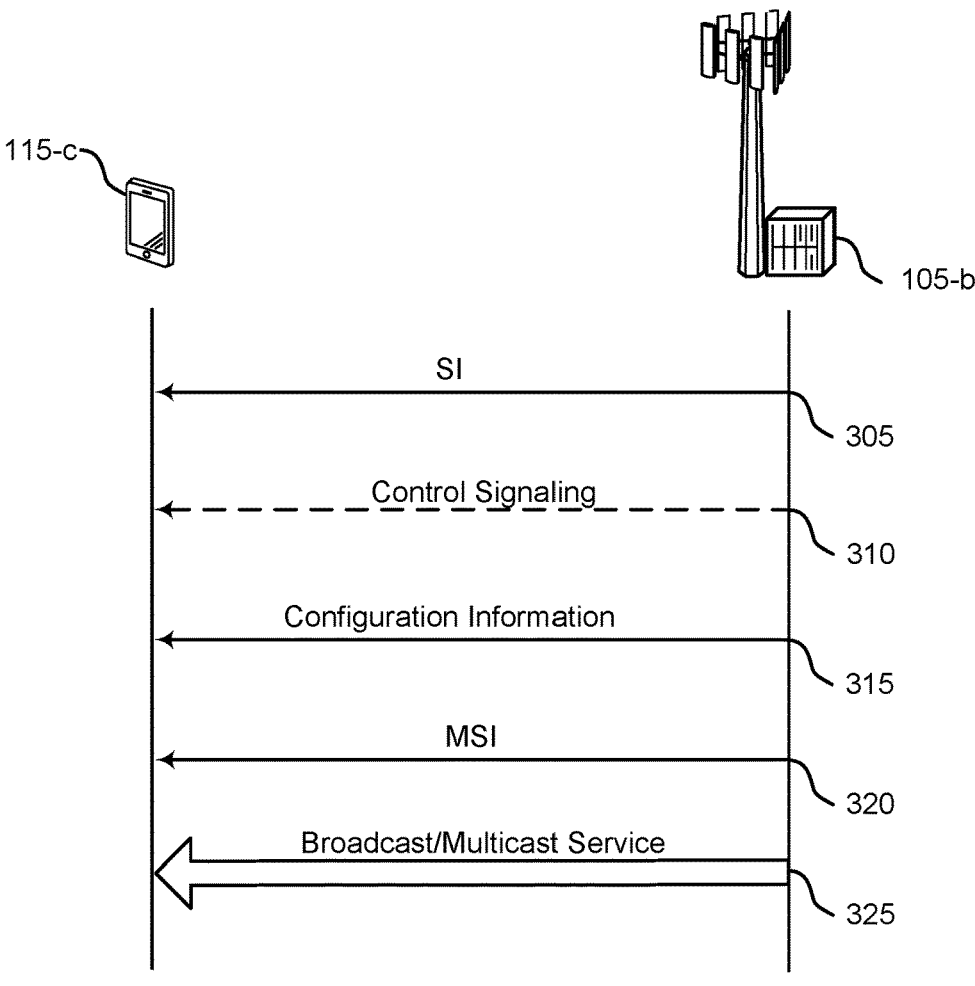
FIG. 3 illustrates an example of a process flow that supports configuration of multiple sets of frequency resources for broadcast and multicast communications in accordance with aspects of the present disclosure.

FIG. 3 illustrates an example of a process flow 300 that supports configuration of multiple sets of frequency resources for broadcast and multicast communications in accordance with aspects of the present disclosure. Process flow 300 may include a base station 105-*b*, and a UE 115-*c*, which may be examples of corresponding devices described with reference to FIGS. 1-2.

At 305, the base station 105-*b* may transmit, and the UE 115-*c* may receive, system information (for example, a SIB). The system information may include an indication of a list of multicast-broadcast network areas (for example, MBSFN areas). Each multicast-broadcast network area may be for providing respective services.

At 315, the base station 105-*b* may transmit, and the UE 115-*c* may receive, configuration information. The configuration information may be multicast configuration information (for example, on an MCCH). The configuration information may be for a first multicast-broadcast network area of the multiple multicast-broadcast network areas indicated in the SI. The configuration information may be associated with an MBSFN area in which the UE 115-*c* is located. The configuration information may indicate a location (for example, time and frequency resources) of MSI for the multicast-broadcast network area. In some examples, the UE 115-*c* may receive the configuration information on a primary carrier. The primary carrier (for example, and other primary carriers) may be allocated for receiving the configuration information. In such examples, secondary carriers may not be allocated for receiving the configuration information. In some examples, the UE 115-*c* may receive the configuration information on a secondary carrier. The secondary carrier, and primary carriers, may be allocated for receiving the configuration information. In such examples, there may not be any restrictions as to which carriers (for example, primary carriers or secondary carriers) support transmission of configuration information.

At 320, the base station 105-*b* may transmit, and the UE 115-*c* may receive, the MSI. The UE 115-*c* may monitor the time and frequency resources indicated by the configuration information for the MSI associated with the one or more multicast or broadcast services provided by the multicast-broadcast network area in which the UE 115-*c* is located. The MSI may include scheduling information indicating frequency resources on which to receive broadcast service or multicast service from the base station 105-*b*. The multicast service or broadcast service may associated with the first multicast-broadcast network area.

The MSI may indicate a first set of the frequency resources and a second set of the frequency resources. The first set of the frequency resources may not be contiguous with the second set of frequency resources. The different sets of frequency resources may be different cells, different channels (for example, in a channel-bonding configuration), different carriers (for example, in a carrier aggregation), different bands, different BWPs, among other examples. The MSI may include a mapping of multiple sets of the frequency resources to one or more respective services for the multicast-broadcast network area.

In some examples, the UE 115-*c* may receive the MSI on a primary carrier. The primary carrier (for example, and other primary carriers) may be allocated for receiving the MSIs. In such examples, secondary carriers may not be allocated for receiving the MSIs. In some examples, the UE 115-*c* may receive the MSI on a secondary carrier. The secondary carrier, and one or more primary carriers, may be allocated for receiving the MSIs. In such examples, there may not be any restrictions as to which carriers (for example, primary carriers or secondary carriers) support transmission of MSIs.

The UE 115-*c* may receive the MSI via semi-persistent scheduling signaling. In some examples, the base station 105-*b* may transmit (for example, periodically), multiple instances of semi-persistence scheduled MSIs. Some instances of the semi-persistence scheduled MSIs may be allocated for a first type of UE including the UE 115-*c* (for example, UEs 115 having a first capability), and some instances of the semi-persistence scheduled MSIs may be allocated for a second type of UE (for example, UEs 115 that have a second capability, lack the first capability, among other examples). The UE 115-*c* may monitor for the MSI during the first set of instances of the semi-persistence scheduling (for example, the instances for the first type of UE). The UE 115-*c* may ignore the instances of the semi-persistence scheduled MSI that are allocated for the second type of UE (for example, or may be unaware of the instances of the semi-persistence scheduled MSI that are allocated for the second type of UE). The base station 105-*a* may indicate the pattern of different MSI instances in the configuration information at 315, in separate control signaling at 310, or a combination thereof.

At 325, the base station 105-*b* may provide the broadcast service or multicast service on the frequency resources indicated by the base station 105-*b* in the MSI.

In some examples, the base station 105-*b* may transmit, and the UE 115-*c* may receive, one or more redundancy versions of a TB. The base station may transmit an indication of a redundancy version configuration for the frequency resources, and the UE 115-*c* may receive the broadcast service or multicast service at 325 according to the redundancy version configuration. The redundancy version configuration may include an indication or mapping of a pattern of redundancy versions across the frequency resources, across time resources, or both (for example, Table 1, as described in greater detail with reference to FIG. 2). The base station 105-*b* may include the redundancy version configuration in the configuration information at 315, the MSI at 320, or separate control signaling (such as control signaling at 310), or any combination thereof. In some examples, the base station 105-*a* may configure a set of candidate redundancy version configurations (for example, via the control signaling at 310 or the configuration information at 315), and may activate or index one of the candidates redundancy version configurations (for example, via the configuration information at 315 or the MSI at 320).

In some examples, the base station 105-*b* may transmit, and the UE 115-*c* may receive, an indication of an outer coding configuration for receiving the broadcast service or multicast service across the frequency resources. The indication of the outer coding configuration may be included in control signaling at 310, configuration information at 315, the MSI at 320, or a combination thereof. The outer coding configuration information may include one or more parameters, as described in greater detail with reference to FIG. 2.

In some examples, the base station 105-*b* may transmit the MSI in a GC-DCI message. The GC-DCI message may include the MSI on a first set of the frequency resources (for example, a first carrier), and may schedule multicast services at 325 on a second set of the frequency resources (for example, a second carrier in a cross-carrier scheduling scenario). The base station 105-*a* may schedule the multicast services at 325 according to a threshold time delay (for example, defining an amount of time between receiving the GC-DCI at 320 and receiving the multicast services at 325). The threshold time delay may be configured by the base station 105-*b*, requested by the UE 115-*c*, or may be defined by one or more rules (for example, in one or more standards documents).

In some examples, the base station 105-*b* may transmit, and the UE 115-*c* may receive, control signaling indicating a layer associated with combining the broadcast or multicast service across indicated frequency resources. The control signaling may be system information, configuration information, or any other control signaling. The control signaling may indicate whether combining of broadcast or multicast services received across the indicated subsets of frequency resources are3 to be combined at a first level (for example, a level of HARQ processes, such as a MAC level, a physical layer, or both, among other examples), or a second level (for example, at a radio link control (RLC) layer or a packet data convergence protocol (PDCP) layer, among other examples). In some examples, if the control signaling indicates that the UE 1145-*c* is to perform combining for broadcast or multicast services provided across multiple subsets of frequency resources (for example, multiple carries, multiple channels, among other examples), then such an instruction may imply that HARQ processes in the different subsets of frequency resources are not to be combined.

Figure 4:
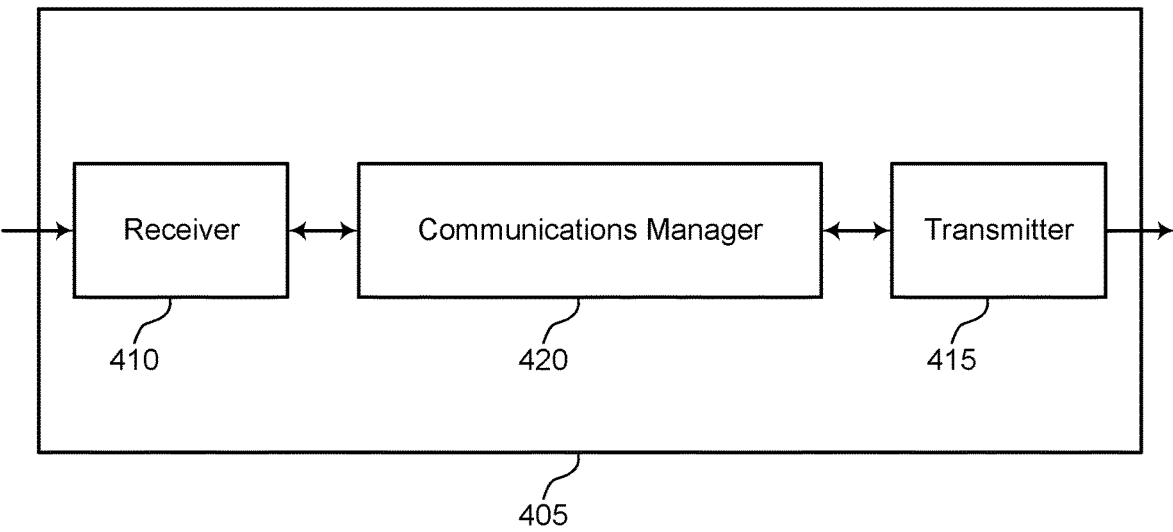
FIGS. 4 and 5 show block diagrams of devices that support configuration of multiple sets of frequency resources for broadcast and multicast communications in accordance with aspects of the present disclosure.

FIG. 4 shows a block diagram of a device 405 that supports configuration of multiple sets of frequency resources for broadcast and multicast communications in accordance with aspects of the present disclosure. The device 405 may be an example of aspects of a UE 115 as described herein. The device 405 may include a receiver 410, a transmitter 415, and a communications manager 420. The communications manager 420 can be implemented, at least in part, by one or both of a modem and a processor. Each of these components may be in communication with one another (for example, via one or more buses).

The receiver 410 may provide a means for receiving information such as packets, user data, control information, or any combination thereof associated with various information channels (for example, control channels, data channels, information channels related to configuration of multiple sets of frequency resources for broadcast and multicast communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to configuration of multiple sets of frequency resources for broadcast and multicast communications). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of configuration of multiple sets of frequency resources for broadcast and multicast communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 420, the receiver 410, the transmitter 415, or various combinations or components thereof may be implemented in code (for example, as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 420 may be configured to perform various operations (for example, receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, system information indicating a set of multiple multicast-broadcast network areas, each multicast-broadcast network area for providing one or more respective services. The communications manager 420 may be configured as or otherwise support a means for receiving, for a first multicast-broadcast network area of the set of multiple multicast-broadcast network areas and based on the system information, multicast configuration information indicating a location of multicast scheduling information for the first multicast-broadcast network area. The communications manager 420 may be configured as or otherwise support a means for receiving the multicast scheduling information for the first multicast-broadcast network area based on the multicast configuration information, the multicast scheduling information indicating frequency resources on which to receive broadcast service or multicast service associated with the first multicast-broadcast network area. The communications manager 420 may be configured as or otherwise support a means for receiving the broadcast service or multicast service on the frequency resources based on the multicast scheduling information.

By including or configuring the communications manager 420 in accordance with examples as described herein, the device 405 (for example, a processor controlling or otherwise coupled to the receiver 410, the transmitter 415, the communications manager 420, or a combination thereof) may support techniques for broadcast service or multicast service across multiple frequency resources, which may result in more efficient use of multicast or broadcast resources, increased throughput, improved diversity of broadcast or multicast operators, more reliable multicast and broadcast services, and improved user experience.

Figure 5:
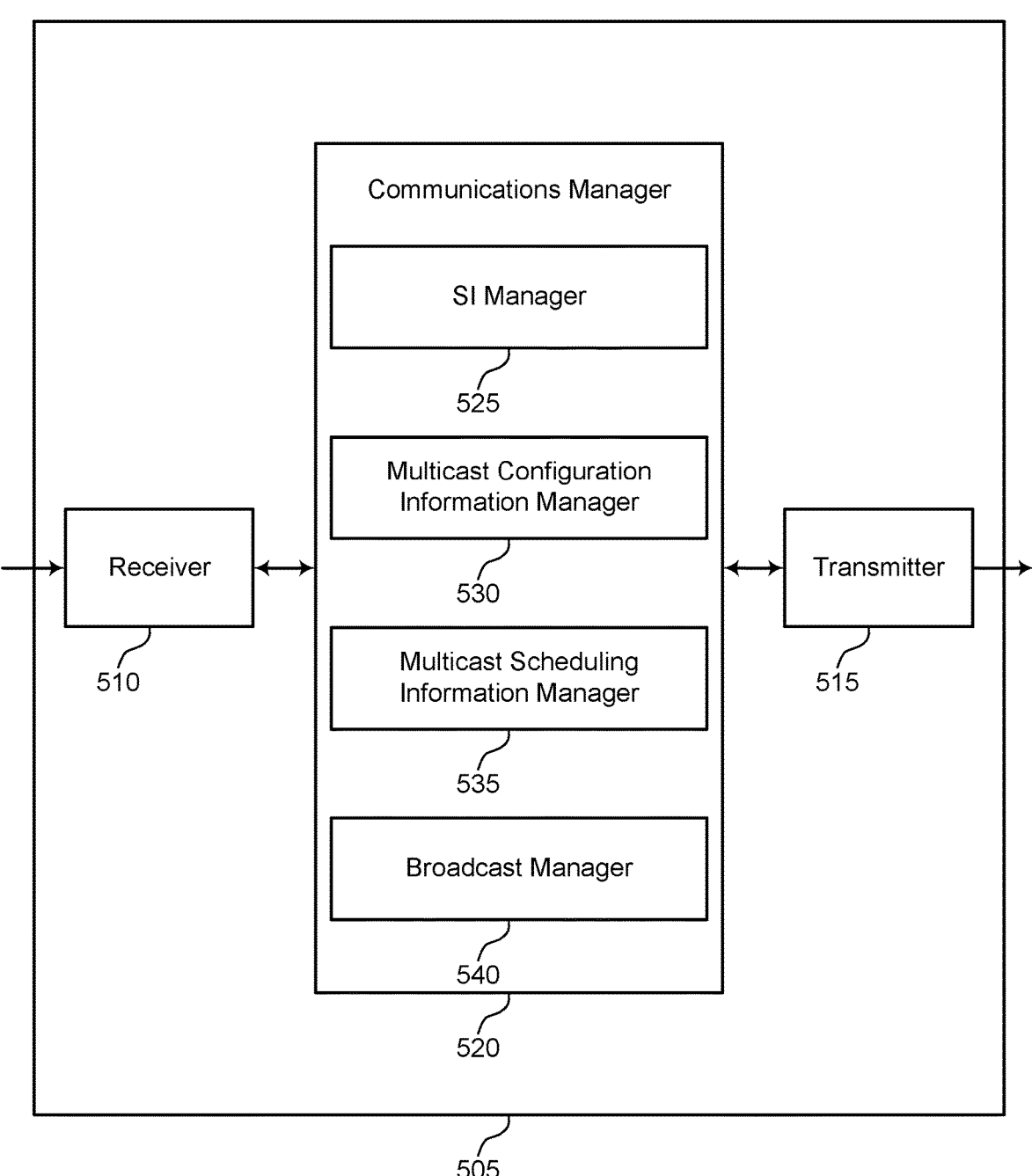

FIG. 5 shows a block diagram of a device 505 that supports configuration of multiple sets of frequency resources for broadcast and multicast communications in accordance with aspects of the present disclosure. The device 505 may be an example of aspects of a device 405 or a UE 115 as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to configuration of multiple sets of frequency resources for broadcast and multicast communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to configuration of multiple sets of frequency resources for broadcast and multicast communications). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of configuration of multiple sets of frequency resources for broadcast and multicast communications as described herein. For example, the communications manager 520 may include an SI manager 525, a multicast configuration information manager 530, a multicast scheduling information manager 535, a broadcast manager 540, or any combination thereof. The communications manager 520 may be an example of aspects of a communications manager 420 as described herein. In some examples, the communications manager 520, or various components thereof, may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The SI manager 525 may be configured as or otherwise support a means for receiving, from a base station, system information indicating a set of multiple multicast-broadcast network areas, each multicast-broadcast network area for providing one or more respective services. The multicast configuration information manager 530 may be configured as or otherwise support a means for receiving, for a first multicast-broadcast network area of the set of multiple multicast-broadcast network areas and based on the system information, multicast configuration information indicating a location of multicast scheduling information for the first multicast-broadcast network area. The multicast scheduling information manager 535 may be configured as or otherwise support a means for receiving the multicast scheduling information for the first multicast-broadcast network area based on the multicast configuration information, the multicast scheduling information indicating frequency resources on which to receive broadcast service or multicast service associated with the first multicast-broadcast network area. The broadcast manager 540 may be configured as or otherwise support a means for receiving the broadcast service or multicast service on the frequency resources based on the multicast scheduling information.

Figure 6:
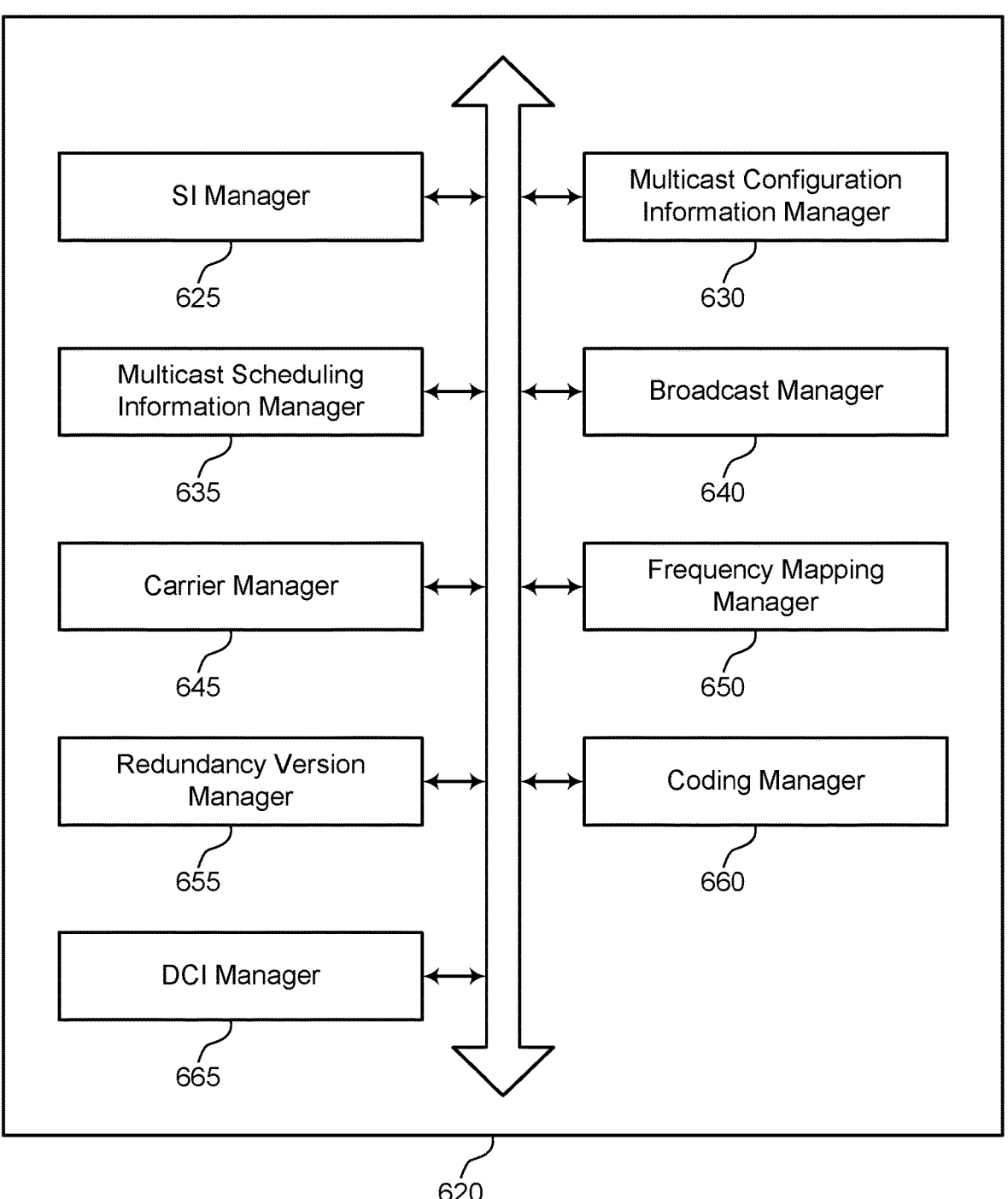
FIG. 6 shows a block diagram of a communications manager that supports configuration of multiple sets of frequency resources for broadcast and multicast communications in accordance with aspects of the present disclosure.

FIG. 6 shows a block diagram of a communications manager 620 that supports configuration of multiple sets of frequency resources for broadcast and multicast communications in accordance with aspects of the present disclosure. The communications manager 620 may be an example of aspects of a communications manager 420, a communications manager 520, or both, as described herein. The communications manager 620, or various components thereof, may be an example of means for performing various aspects of configuration of multiple sets of frequency resources for broadcast and multicast communications as described herein. For example, the communications manager 620 may include an SI manager 625, a multicast configuration information manager 630, a multicast scheduling information manager 635, a broadcast manager 640, a carrier manager 645, a frequency mapping manager 650, a redundancy version manager 655, a coding manager 660, a DCI manager 665, or any combination thereof. Each of these components may communicate, directly or indirectly, with one another (for example, via one or more buses).

The communications manager 620 may support wireless communications at a UE in accordance with examples as disclosed herein. The SI manager 625 may be configured as or otherwise support a means for receiving, from a base station, system information indicating a set of multiple multicast-broadcast network areas, each multicast-broadcast network area for providing one or more respective services. The multicast configuration information manager 630 may be configured as or otherwise support a means for receiving, for a first multicast-broadcast network area of the set of multiple multicast-broadcast network areas and based on the system information, multicast configuration information indicating a location of multicast scheduling information for the first multicast-broadcast network area. The multicast scheduling information manager 635 may be configured as or otherwise support a means for receiving the multicast scheduling information for the first multicast-broadcast network area based on the multicast configuration information, the multicast scheduling information indicating frequency resources on which to receive broadcast service or multicast service associated with the first multicast-broadcast network area. The broadcast manager 640 may be configured as or otherwise support a means for receiving the broadcast service or multicast service on the frequency resources based on the multicast scheduling information.

In some examples, to support receiving the multicast configuration information and the multicast scheduling information, the carrier manager 645 may be configured as or otherwise support a means for receiving the multicast configuration information, the multicast scheduling information, or both, via a primary carrier allocated for transmission of the multicast configuration information, the multicast scheduling information, or both, where the frequency resources include first resources of the primary carrier and second resources of at least one secondary carrier.

In some examples, to support receiving the multicast configuration information and the multicast scheduling information, the carrier manager 645 may be configured as or otherwise support a means for receiving the multicast configuration information, the multicast scheduling information, or both, via a secondary carrier, where a primary carrier and the secondary carrier are allocated for transmission of the multicast configuration information, the multicast scheduling information, or both, and where the frequency resources include first resources of the primary carrier and second resources of the secondary carrier. In some examples, the multicast scheduling information indicates a first subset of the frequency resources and a second subset of the frequency resources. In some examples, the first subset of the frequency resources are non-contiguous with the second subset of the frequency resources. In some examples, the frequency resources include a set of multiple carriers of a carrier aggregation, a set of multiple channels of a channel-bonding configuration, a set of multiple cells, or any combination thereof.

In some examples, to support multicast scheduling information, the frequency mapping manager 650 may be configured as or otherwise support a means for a mapping of a set of multiple subsets of the frequency resources to one or more respective services for the first multicast-broadcast network area. In some examples, is received via semi-persistent scheduling signaling.

In some examples, the multicast scheduling information manager 635 may be configured as or otherwise support a means for receiving, from the base station, control signaling indicating a first set of instances of the multicast scheduling information allocated for a first type of UE that includes the UE, and a second set of instances of a second multicast scheduling information allocated for a second type of UE. In some examples, the multicast scheduling information manager 635 may be configured as or otherwise support a means for monitoring for the multicast scheduling information during the first set of instances of the multicast based on receiving the control signaling and the UE being the first type of UE.

In some examples, the redundancy version manager 655 may be configured as or otherwise support a means for receiving, from the base station, an indication of a redundancy version configuration for the frequency resources, where receiving the broadcast service or multicast service is based on the redundancy version configuration.

In some examples, the redundancy version manager 655 may be configured as or otherwise support a means for receiving, from the base station, control signaling including a set of multiple redundancy version configurations that include the redundancy version configuration, each of the set of multiple redundancy version configurations associated with a respective index value of a set of multiple index values, where the indication of the redundancy version configuration includes the respective index value associated with the redundancy version configuration. In some examples, the redundancy version configuration includes a pattern of time resources, a pattern associated with the frequency resources, or both, for receiving the broadcast service or multicast service across the frequency resources. In some examples, the redundancy version manager 655 may be configured as or otherwise support a means for receiving, from the base station, control signaling indicating a layer within a protocol stack associated with combining the broadcast or multicast service across the frequency resources, wherein the layer associated with the combining comprises a medium access control layer or a physical layer. In some examples, the redundancy version manager 655 may be configured as or otherwise support a means for combining, by the UE, a plurality of HARQ redundancy versions across the of frequency resources.

In some examples, the coding manager 660 may be configured as or otherwise support a means for receiving, from the base station, an indication of an outer coding configuration for receiving the broadcast service or multicast service across the frequency resources. In some examples, to support receiving the multicast scheduling information, the DCI manager 665 may be configured as or otherwise support a means for receiving a group-common downlink control information message that includes the multicast scheduling information on a first subset of the frequency resources. In some examples, to support receiving the broadcast service or multicast service, the DCI manager 665 may be configured as or otherwise support a means for receiving the broadcast service or multicast service according to a threshold time delay. In some examples, to support receiving the multicast scheduling information, the DCI manager 665 may be configured as or otherwise support a means for monitoring for downlink control information on a control resource set, decoding a group common downlink control information message that includes multicast scheduling information for a multicast-broadcast network area, the multicast scheduling information indicating frequency resources on which to receive a broadcast or multicast service associated with the multicast-broadcast network area, and receiving the broadcast or multicast service on the frequency resources based at least in part on the multicast scheduling information.

In some examples, to support receiving the multicast scheduling information, the DCI manager 665 may be configured as or otherwise support a means for receiving a transport block that is mapped over the frequency resources, wherein the frequency resources include a single carrier or a plurality of carriers of a carrier aggregation. In some examples, the frequency resources may include a virtual carrier including a plurality of carriers.

In some examples, to support receiving the multicast scheduling information, the DCI manager 665 may be configured as or otherwise support a means for receiving the multicast or broadcast service according to a threshold time delay.

Figure 7:
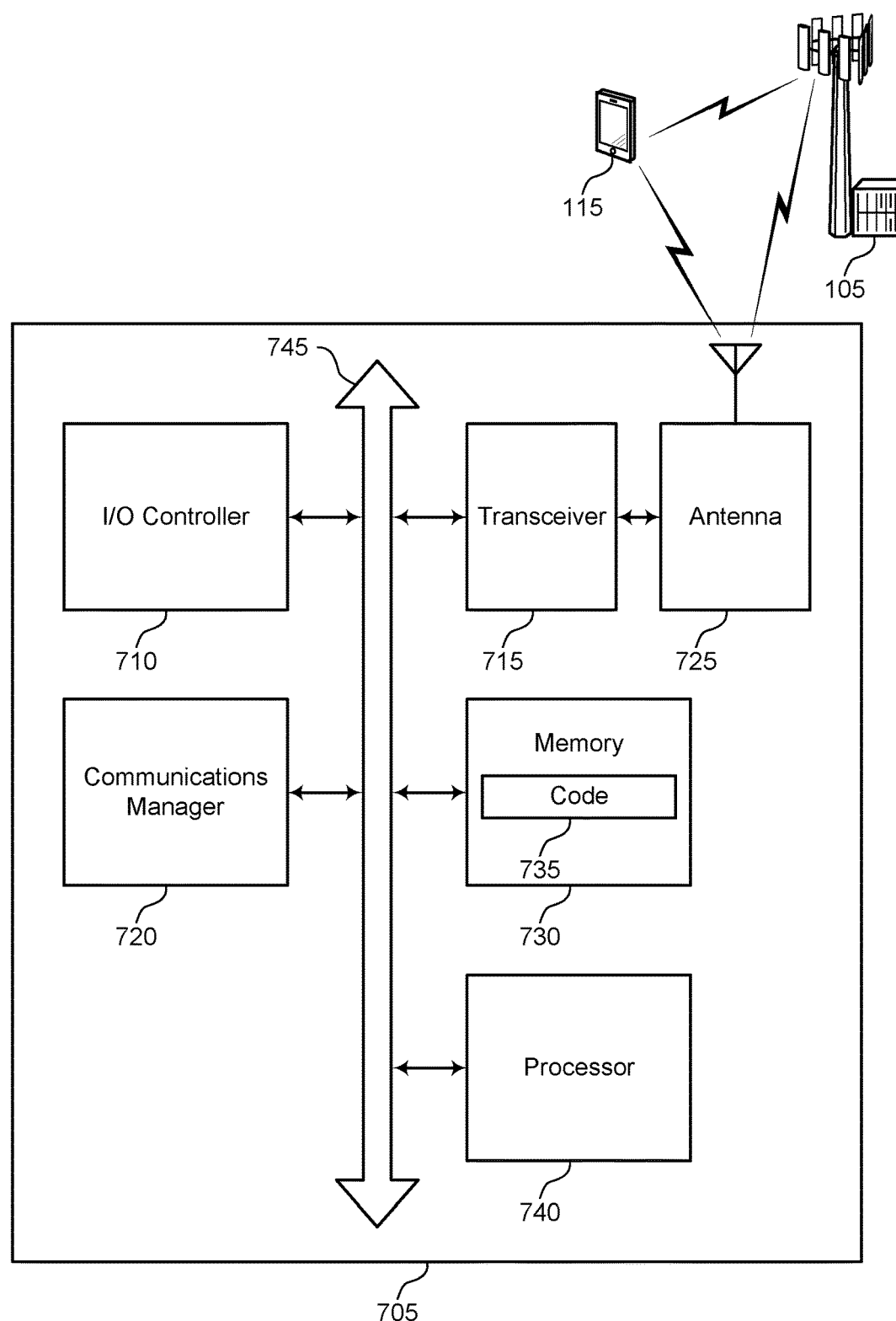
FIG. 7 shows a diagram of a system including a device that supports configuration of multiple sets of frequency resources for broadcast and multicast communications in accordance with aspects of the present disclosure.

FIG. 7 shows a diagram of a system including a device 705 that supports configuration of multiple sets of frequency resources for broadcast and multicast communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some examples, the I/O controller 710 may represent a physical connection or port to an external peripheral. In some examples, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some examples, the I/O controller 710 may be implemented as part of a processor, such as the processor 740. In some examples, a user may interact with the device 705 via the I/O controller 710 or via hardware components controlled by the I/O controller 710.

In some examples, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (for example, when compiled and executed) to perform functions described herein. In some examples, the memory 730 may contain, among other things, a basic I/O system (BIOS) which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting configuration of multiple sets of frequency resources for broadcast and multicast communications). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, system information indicating a set of multiple multicast-broadcast network areas, each multicast-broadcast network area for providing one or more respective services. The communications manager 720 may be configured as or otherwise support a means for receiving, for a first multicast-broadcast network area of the set of multiple multicast-broadcast network areas and based on the system information, multicast configuration information indicating a location of multicast scheduling information for the first multicast-broadcast network area. The communications manager 720 may be configured as or otherwise support a means for receiving the multicast scheduling information for the first multicast-broadcast network area based on the multicast configuration information, the multicast scheduling information indicating frequency resources on which to receive broadcast service or multicast service associated with the first multicast-broadcast network area. The communications manager 720 may be configured as or otherwise support a means for receiving the broadcast service or multicast service on the frequency resources based on the multicast scheduling information.

By including or configuring the communications manager 720 in accordance with examples as described herein, the device 705 may support techniques for multicast and broadcast service or multicast service across multiple frequency resources, which may result in more efficient use of multicast or broadcast resources, increased throughput, improved diversity of broadcast or multicast operators, more reliable multicast and broadcast services, and improved user experience.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of configuration of multiple sets of frequency resources for broadcast and multicast communications as described herein, or the processor 740 and the memory 730 may be otherwise configured to perform or support such operations.

Figure 8:
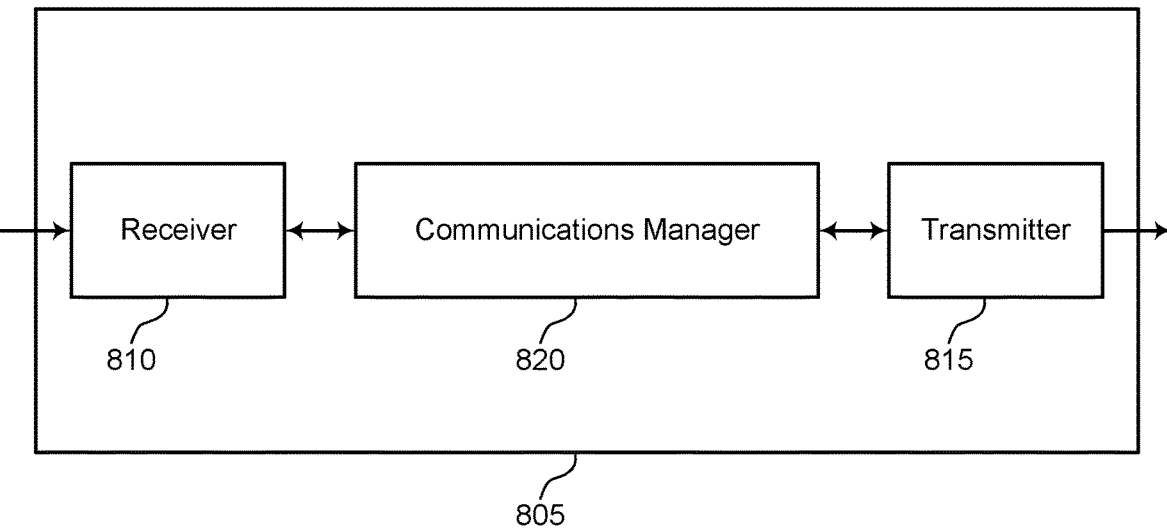
FIGS. 8 and 9 show block diagrams of devices that support configuration of multiple sets of frequency resources for broadcast and multicast communications in accordance with aspects of the present disclosure.

FIG. 8 shows a block diagram of a device 805 that supports configuration of multiple sets of frequency resources for broadcast and multicast communications in accordance with aspects of the present disclosure. The device 805 may be an example of aspects of a base station 105 as described herein. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to configuration of multiple sets of frequency resources for broadcast and multicast communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to configuration of multiple sets of frequency resources for broadcast and multicast communications). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of configuration of multiple sets of frequency resources for broadcast and multicast communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 820 may be configured to perform various operations (for example, receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, system information indicating a set of multiple multicast-broadcast network areas, each multicast-broadcast network area for providing one or more respective services. The communications manager 820 may be configured as or otherwise support a means for transmitting, for a first multicast-broadcast network area of the set of multiple multicast-broadcast network areas and according to the system information, multicast configuration information indicating a location of multicast scheduling information for the first multicast-broadcast network area. The communications manager 820 may be configured as or otherwise support a means for transmitting the multicast scheduling information for the first multicast-broadcast network area based on the multicast configuration information, the multicast scheduling information indicating frequency resources on which to receive broadcast service or multicast service for a service associated with the first multicast-broadcast network area. The communications manager 820 may be configured as or otherwise support a means for transmitting the broadcast service or multicast service on the frequency resources based on the multicast scheduling information.

By including or configuring the communications manager 820 in accordance with examples as described herein, the device 805 (for example, a processor controlling or otherwise coupled to the receiver 810, the transmitter 815, the communications manager 820, or a combination thereof) may support techniques for multicast and broadcast services across multiple frequency resources, which may result in more efficient use of multicast or broadcast resources, increased throughput, improved diversity of broadcast or multicast operators, more reliable multicast and broadcast services, and improved user experience.

Figure 9:
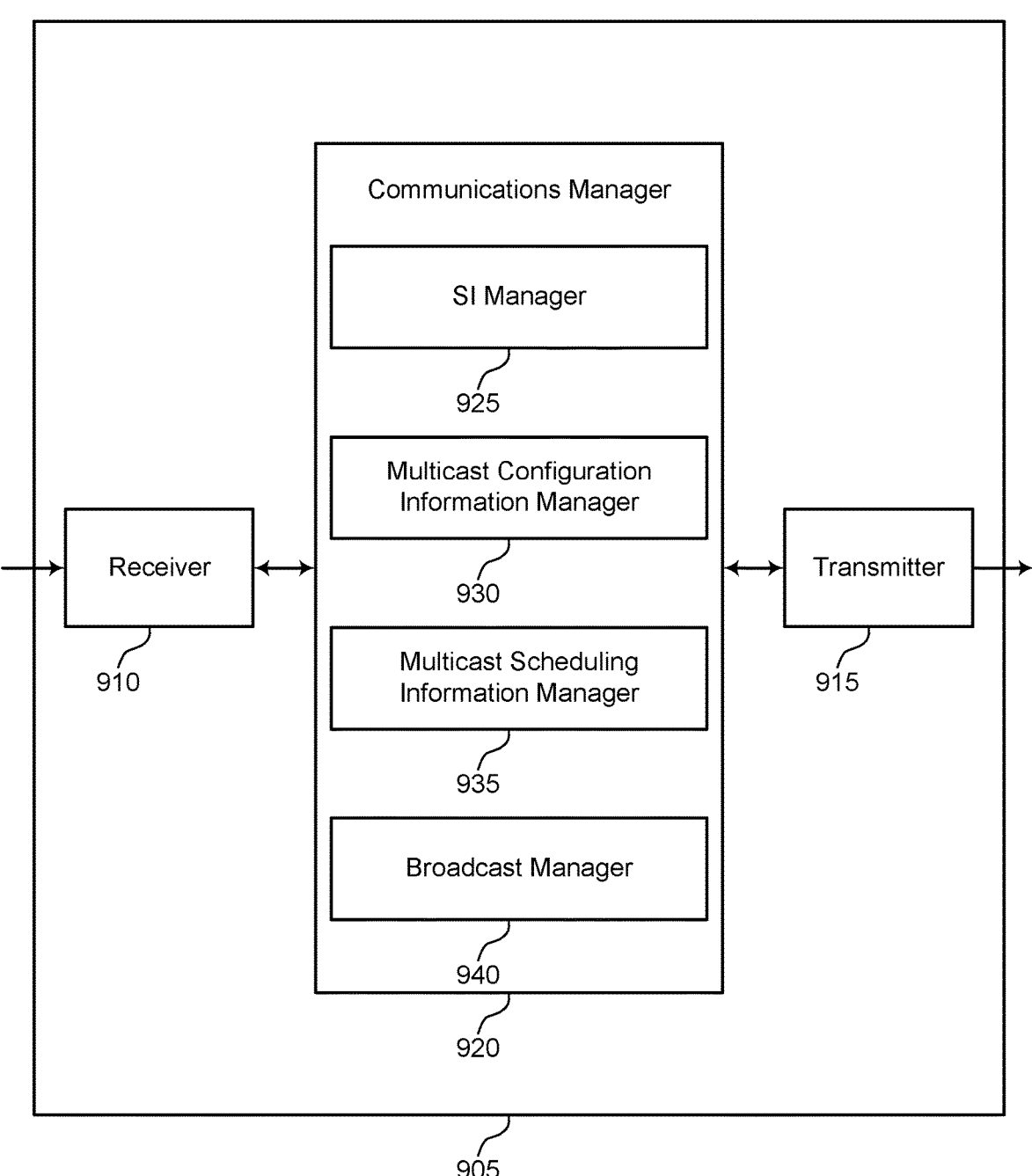

FIG. 9 shows a block diagram of a device 905 that supports configuration of multiple sets of frequency resources for broadcast and multicast communications in accordance with aspects of the present disclosure. The device 905 may be an example of aspects of a device 805 or a base station 105 as described herein. The device 905 may include a receiver 910, a transmitter 915, and a communications manager 920 The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to configuration of multiple sets of frequency resources for broadcast and multicast communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to configuration of multiple sets of frequency resources for broadcast and multicast communications). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of configuration of multiple sets of frequency resources for broadcast and multicast communications as described herein. For example, the communications manager 920 may include an SI manager 925, a multicast configuration information manager 930, a multicast scheduling information manager 935, a broadcast manager 940, or any combination thereof. The communications manager 920 may be an example of aspects of a communications manager 820 as described herein. In some examples, the communications manager 920, or various components thereof, may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The SI manager 925 may be configured as or otherwise support a means for transmitting, to a UE, system information indicating a set of multiple multicast-broadcast network areas, each multicast-broadcast network area for providing one or more respective services. The multicast configuration information manager 930 may be configured as or otherwise support a means for transmitting, for a first multicast-broadcast network area of the set of multiple multicast-broadcast network areas and according to the system information, multicast configuration information indicating a location of multicast scheduling information for the first multicast-broadcast network area. The multicast scheduling information manager 935 may be configured as or otherwise support a means for transmitting the multicast scheduling information for the first multicast-broadcast network area based on the multicast configuration information, the multicast scheduling information indicating frequency resources on which to receive broadcast service or multicast service associated with the first multicast-broadcast network area. The broadcast manager 940 may be configured as or otherwise support a means for transmitting the broadcast service or multicast service on the frequency resources based on the multicast scheduling information.

Figure 10:
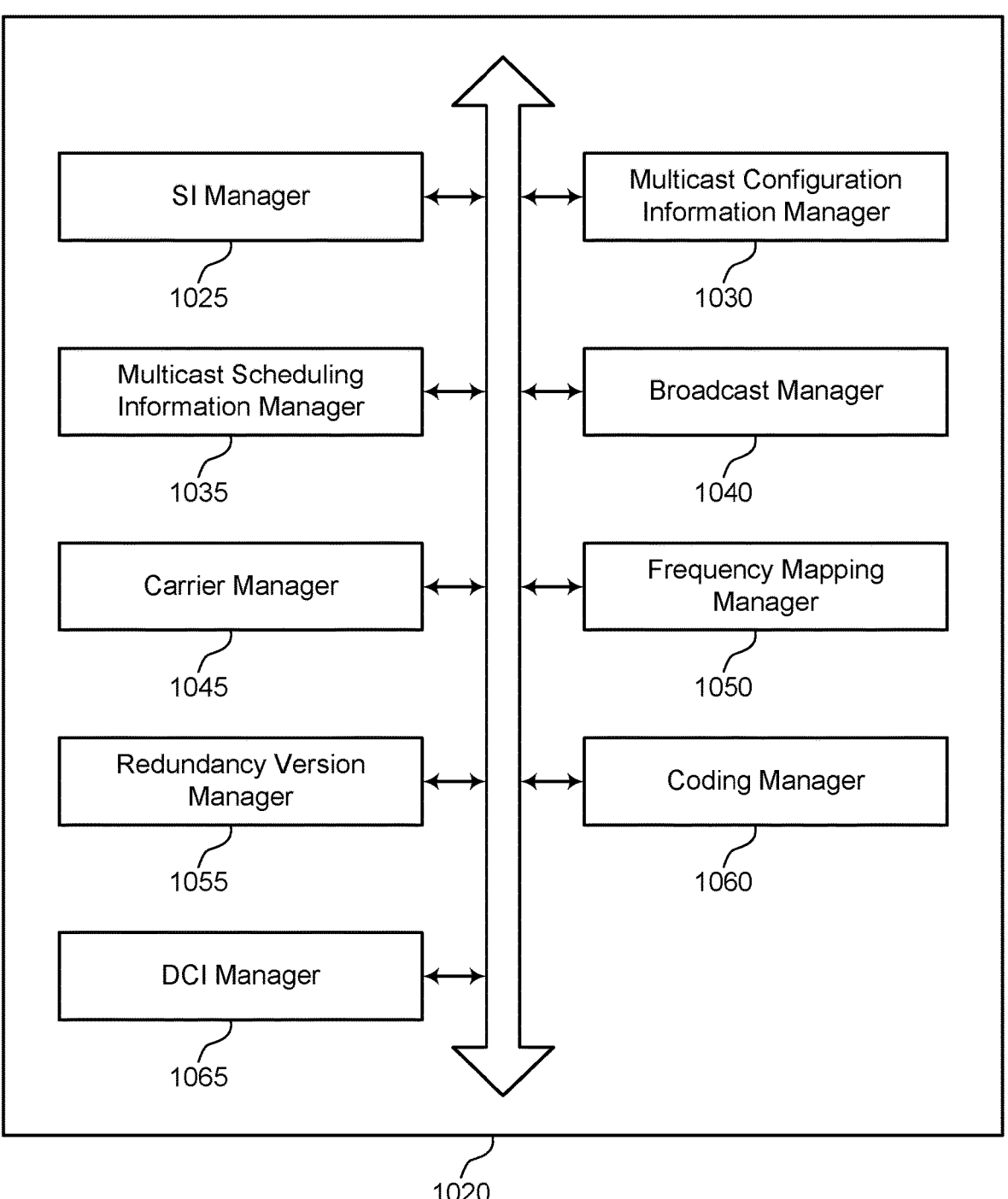
FIG. 10 shows a block diagram of a communications manager that supports configuration of multiple sets of frequency resources for broadcast and multicast communications in accordance with aspects of the present disclosure.

FIG. 10 shows a block diagram of a communications manager 1020 that supports configuration of multiple sets of frequency resources for broadcast and multicast communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of configuration of multiple sets of frequency resources for broadcast and multicast communications as described herein. For example, the communications manager 1020 may include an SI manager 1025, a multicast configuration information manager 1030, a multicast scheduling information manager 1035, a broadcast manager 1040, a carrier manager 1045, a frequency mapping manager 1050, a redundancy version manager 1055, a coding manager 1060, a DCI manager 1065, or any combination thereof. Each of these components may communicate, directly or indirectly, with one another (for example, via one or more buses).

The communications manager 1020 may support wireless communications at a base station in accordance with examples as disclosed herein. The SI manager 1025 may be configured as or otherwise support a means for transmitting, to a UE, system information indicating a set of multiple multicast-broadcast network areas, each multicast-broadcast network area for providing one or more respective services. The multicast configuration information manager 1030 may be configured as or otherwise support a means for transmitting, for a first multicast-broadcast network area of the set of multiple multicast-broadcast network areas and according to the system information, multicast configuration information indicating a location of multicast scheduling information for the first multicast-broadcast network area. The multicast scheduling information manager 1035 may be configured as or otherwise support a means for transmitting the multicast scheduling information for the first multicast-broadcast network area based on the multicast configuration information, the multicast scheduling information indicating frequency resources on which to receive broadcast service or multicast service associated with the first multicast-broadcast network area. The broadcast manager 1040 may be configured as or otherwise support a means for transmitting the broadcast service or multicast service on the frequency resources based on the multicast scheduling information.

In some examples, to support transmitting the multicast configuration information and the multicast scheduling information, the carrier manager 1045 may be configured as or otherwise support a means for transmitting the multicast configuration information, the multicast scheduling information, or both, via a primary carrier allocated for transmission of the multicast configuration information, the multicast scheduling information, or both, where the frequency resources include first resources of the primary carrier and second resources of at least one secondary carrier.

In some examples, to support transmitting the multicast configuration information and the multicast scheduling information, the carrier manager 1045 may be configured as or otherwise support a means for transmitting the multicast configuration information, the multicast scheduling information, or both, via a secondary carrier, where a primary carrier and the secondary carrier are allocated for transmission of the multicast configuration information, the multicast scheduling information, or both, and where the frequency resources include first resources of a primary carrier and second resources of the secondary carrier. In some examples, the multicast scheduling information indicates a first subset of the frequency resources and a second subset of the frequency resources. In some examples, the first subset of the frequency resources are non-contiguous with the second subset of the frequency resources. In some examples, the frequency resources include a set of multiple carriers of a carrier aggregation, a set of multiple channels of a channel-bonding configuration, a set of multiple cells, or any combination thereof.

In some examples, to support multicast scheduling information, the frequency mapping manager 1050 may be configured as or otherwise support a means for a mapping of a set of multiple subsets of the frequency resources to one or more respective services for the first multicast-broadcast network area. In some examples, the multicast scheduling information is transmitted via semi-persistent scheduling signaling. In some examples, the frequency mapping manager 1050 may be configured as or otherwise support a means for transmitting, to the UE, control signaling indicating a first set of the multicast scheduling information allocated for a first type of UE that includes the UE, and a second set of instances of a second multicast scheduling information allocated for a second type of UE.

In some examples, the redundancy version manager 1055 may be configured as or otherwise support a means for transmitting, to the UE, an indication of a redundancy version configuration for the frequency resources, where transmitting the broadcast service or multicast service is based on the redundancy version configuration.

In some examples, the redundancy version manager 1055 may be configured as or otherwise support a means for transmitting, to the UE, control signaling including a set of multiple redundancy version configurations that include the redundancy version configuration, each of the set of multiple redundancy version configurations associated with a respective index value of a set of multiple index values, where the indication of the redundancy version configuration includes an index value associated with the redundancy version configuration.

In some examples, the coding manager 1060 may be configured as or otherwise support a means for transmitting, to the UE, an indication of an outer coding configuration for receiving the broadcast service or multicast service across the frequency resources.

In some examples, to support transmitting the multicast scheduling information, the DCI manager 1065 may be configured as or otherwise support a means for transmitting a group-common downlink control information message that includes the multicast scheduling information on a first subset of the frequency resources.

FIG. 11 shows a diagram of a system including a device 1105 that supports configuration of multiple sets of frequency resources for broadcast and multicast communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (for example, operatively, communicatively, functionally, electronically, electrically) via one or more buses (for example, a bus 1150).

The network communications manager 1110 may manage communications with a core network 130 (for example, via one or more wired backhaul links). For example, the network communications manager 1110 may manage the transfer of data communications for client devices, such as one or more UEs 115.

In some examples, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some examples, the code 1135 may not be directly executable by the processor 1140 but may cause a computer (for example, when compiled and executed) to perform functions described herein. In some examples, the memory 1130 may contain, among other things, a BIOS which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting configuration of multiple sets of frequency resources for broadcast and multicast communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, system information indicating a set of multiple multicast-broadcast network areas, each multicast-broadcast network area for providing one or more respective services. The communications manager 1120 may be configured as or otherwise support a means for transmitting, for a first multicast-broadcast network area of the set of multiple multicast-broadcast network areas and according to the system information, multicast configuration information indicating a location of multicast scheduling information for the first multicast-broadcast network area. The communications manager 1120 may be configured as or otherwise support a means for transmitting the multicast scheduling information for the first multicast-broadcast network area based on the multicast configuration information, the multicast scheduling information indicating frequency resources on which to receive broadcast service or multicast services associated with the first multicast-broadcast network area. The communications manager 1120 may be configured as or otherwise support a means for transmitting the broadcast service or multicast service on the frequency resources based on the multicast scheduling information.

By including or configuring the communications manager 1120 in accordance with examples as described herein, the device 1105 may support techniques for multicast and broadcast services across multiple frequency resources, which may result in more efficient use of multicast or broadcast resources, increased throughput, improved diversity of broadcast or multicast operators, more reliable multicast and broadcast services, and improved user experience.

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of configuration of multiple sets of frequency resources for broadcast and multicast communications as described herein, or the processor 1140 and the memory 1130 may be otherwise configured to perform or support such operations.

FIG. 12 shows a flowchart illustrating a method 1200 that supports configuration of multiple sets of frequency resources for broadcast and multicast communications in accordance with aspects of the present disclosure. The operations of the method 1200 may be implemented by a UE or its components as described herein. For example, the operations of the method 1200 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1205, the method may include receiving, from a base station, system information indicating a set of multiple multicast-broadcast network areas, each multicast-broadcast network area for providing one or more respective services. The operations of 1205 may be performed in accordance with examples as disclosed herein. In some examples, aspects of the operations of 1205 may be performed by an SI manager 625 as described with reference to FIG. 6.

At 1210, the method may include receiving, for a first multicast-broadcast network area of the set of multiple multicast-broadcast network areas and based on the system information, multicast configuration information indicating a location of multicast scheduling information for the first multicast-broadcast network area. The operations of 1210 may be performed in accordance with examples as disclosed herein. In some examples, aspects of the operations of 1210 may be performed by a multicast configuration information manager 630 as described with reference to FIG. 6.

At 1215, the method may include receiving the multicast scheduling information for the first multicast-broadcast network area based on the multicast configuration information, the multicast scheduling information indicating frequency resources on which to receive broadcast service or multicast service associated with the first multicast-broadcast network area. The operations of 1215 may be performed in accordance with examples as disclosed herein. In some examples, aspects of the operations of 1215 may be performed by a multicast scheduling information manager 635 as described with reference to FIG. 6.

At 1220, the method may include receiving the broadcast service or multicast service on the frequency resources based on the multicast scheduling information. The operations of 1220 may be performed in accordance with examples as disclosed herein. In some examples, aspects of the operations of 1220 may be performed by a broadcast manager 640 as described with reference to FIG. 6.

FIG. 13 shows a flowchart illustrating a method 1300 that supports configuration of multiple sets of frequency resources for broadcast and multicast communications in accordance with aspects of the present disclosure. The operations of the method 1300 may be implemented by a UE or its components as described herein. For example, the operations of the method 1300 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, system information indicating a set of multiple multicast-broadcast network areas, each multicast-broadcast network area for providing one or more respective services. The operations of 1305 may be performed in accordance with examples as disclosed herein. In some examples, aspects of the operations of 1305 may be performed by an SI manager 625 as described with reference to FIG. 6.

At 1310, the method may include receiving, for a first multicast-broadcast network area of the set of multiple multicast-broadcast network areas and based on the system information, multicast configuration information indicating a location of multicast scheduling information for the first multicast-broadcast network area. The operations of 1310 may be performed in accordance with examples as disclosed herein. In some examples, aspects of the operations of 1310 may be performed by a multicast configuration information manager 630 as described with reference to FIG. 6.

At 1315, the method may include receiving the multicast scheduling information for the first multicast-broadcast network area based on the multicast configuration information, the multicast scheduling information indicating frequency resources on which to receive broadcast service or multicast service associated with the first multicast-broadcast network area, where the multicast scheduling information indicates a first subset of the frequency resources and a second subset of the frequency resources, and wherein the first subset of frequency resources is noncontiguous with the second subset of the frequency resources. The operations of 1315 may be performed in accordance with examples as disclosed herein. In some examples, aspects of the operations of 1315 may be performed by a multicast scheduling information manager 635 as described with reference to FIG. 6.

At 1320, the method may include receiving the broadcast service or multicast service on the frequency resources based on the multicast scheduling information. The operations of 1320 may be performed in accordance with examples as disclosed herein. In some examples, aspects of the operations of 1320 may be performed by a broadcast manager 640 as described with reference to FIG. 6.

FIG. 14 shows a flowchart illustrating a method 1400 that supports configuration of multiple sets of frequency resources for broadcast and multicast communications in accordance with aspects of the present disclosure. The operations of the method 1400 may be implemented by a UE or its components as described herein. For example, the operations of the method 1400 may be performed by a UE

115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, system information indicating a set of multiple multicast-broadcast network areas, each multicast-broadcast network area for providing one or more respective services. The operations of 1405 may be performed in accordance with examples as disclosed herein. In some examples, aspects of the operations of 1405 may be performed by an SI manager 625 as described with reference to FIG. 6.

At 1410, the method may include receiving, for a first multicast-broadcast network area of the set of multiple multicast-broadcast network areas and based on the system information, multicast configuration information indicating a location of multicast scheduling information for the first multicast-broadcast network area. The operations of 1410 may be performed in accordance with examples as disclosed herein. In some examples, aspects of the operations of 1410 may be performed by a multicast configuration information manager 630 as described with reference to FIG. 6.

At 1415, the method may include receiving, via semi-persistent scheduling signaling, the multicast scheduling information for the first multicast-broadcast network area based on the multicast configuration information, the multicast scheduling information indicating frequency resources on which to receive a broadcast service or multicast service associated with the first multicast-broadcast network area. The operations of 1415 may be performed in accordance with examples as disclosed herein. In some examples, aspects of the operations of 1415 may be performed by a multicast scheduling information manager 635 as described with reference to FIG. 6.

At 1420, the method may include receiving the broadcast service or multicast service on the frequency resources based on the multicast scheduling information. The operations of 1420 may be performed in accordance with examples as disclosed herein. In some examples, aspects of the operations of 1420 may be performed by a broadcast manager 640 as described with reference to FIG. 6.

FIG. 15 shows a flowchart illustrating a method 1500 that supports configuration of multiple sets of frequency resources for broadcast and multicast communications in accordance with aspects of the present disclosure. The operations of the method 1500 may be implemented by a UE or its components as described herein. For example, the operations of the method 1500 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, system information indicating a set of multiple multicast-broadcast network areas, each multicast-broadcast network area for providing one or more respective services. The operations of 1505 may be performed in accordance with examples as disclosed herein. In some examples, aspects of the operations of 1505 may be performed by an SI manager 625 as described with reference to FIG. 6.

At 1510, the method may include receiving, for a first multicast-broadcast network area of the set of multiple multicast-broadcast network areas and based on the system information, multicast configuration information indicating a location of multicast scheduling information for the first multicast-broadcast network area. The operations of 1510 may be performed in accordance with examples as disclosed herein. In some examples, aspects of the operations of 1510 may be performed by a multicast configuration information manager 630 as described with reference to FIG. 6.

At 1515, the method may include receiving the multicast scheduling information for the first multicast-broadcast network area based on the multicast configuration information, the multicast scheduling information indicating frequency resources on which to receive broadcast service or multicast service associated with the first multicast-broadcast network area. The operations of 1515 may be performed in accordance with examples as disclosed herein. In some examples, aspects of the operations of 1515 may be performed by a multicast scheduling information manager 635 as described with reference to FIG. 6.

At 1520, the method may include receiving, from the base station, an indication of a redundancy version configuration for the frequency resources. The operations of 1520 may be performed in accordance with examples as disclosed herein. In some examples, aspects of the operations of 1520 may be performed by a redundancy version manager 655 as described with reference to FIG. 6.

At 1525, the method may include receiving the broadcast service or multicast service on the frequency resources based on the multicast scheduling information, where receiving the broadcast service or multicast service is based on the redundancy version configuration. The operations of 1525 may be performed in accordance with examples as disclosed herein. In some examples, aspects of the operations of 1525 may be performed by a broadcast manager 640 as described with reference to FIG. 6.

FIG. 16 shows a flowchart illustrating a method 1600 that supports configuration of multiple sets of frequency resources for broadcast and multicast communications in accordance with aspects of the present disclosure. The operations of the method 1600 may be implemented by a base station or its components as described herein. For example, the operations of the method 1600 may be performed by a base station 105 as described with reference to FIGS. 1-3 and 8-11. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, system information indicating a set of multiple multicast-broadcast network areas, each multicast-broadcast network area for providing one or more respective services. The operations of 1605 may be performed in accordance with examples as disclosed herein. In some examples, aspects of the operations of 1605 may be performed by an SI manager 1025 as described with reference to FIG. 10.

At 1610, the method may include transmitting, for a first multicast-broadcast network area of the set of multiple multicast-broadcast network areas and according to the system information, multicast configuration information indicating a location of multicast scheduling information for the first multicast-broadcast network area. The operations of 1610 may be performed in accordance with examples as disclosed herein. In some examples, aspects of the operations of 1610 may be performed by a multicast configuration information manager 1030 as described with reference to FIG. 10.

At 1615, the method may include transmitting the multicast scheduling information for the first multicast-broadcast network area based on the multicast configuration information, the multicast scheduling information indicating frequency resources on which to receive broadcast service or multicast service associated with the first multicast-broadcast network area. The operations of 1615 may be performed in accordance with examples as disclosed herein. In some examples, aspects of the operations of 1615 may be performed by a multicast scheduling information manager 1035 as described with reference to FIG. 10.

At 1620, the method may include transmitting the broadcast service or multicast service on the frequency resources based on the multicast scheduling information. The operations of 1620 may be performed in accordance with examples as disclosed herein. In some examples, aspects of the operations of 1620 may be performed by a broadcast manager 1040 as described with reference to FIG. 10.

FIG. 17 shows a flowchart illustrating a method 1700 that supports channel bonding and carrier aggregation for broadcast and multicast communications in accordance with aspects of the present disclosure. The operations of the method 1700 may be implemented by a UE or its components as described herein. For example, the operations of the method 1700 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1705, the method may include monitoring for downlink control information on a control resource set. The operations of 1705 may be performed in accordance with examples as disclosed herein. In some examples, aspects of the operations of 1705 may be performed by a DCI manager 645 as described with reference to FIG. 6.

At 1710, the method may include decoding a group common downlink control information message that includes scheduling information for a multicast-broadcast network area, the scheduling information indicating frequency resources on which to receive a broadcast or multicast service associated with the multicast-broadcast network area. The operations of 1710 may be performed in accordance with examples as disclosed herein. In some examples, aspects of the operations of 1710 may be performed by a DCI manager 645 as described with reference to FIG. 6.

At 1715, the method may include receiving the broadcast or multicast service on the frequency resources based on the scheduling information. The operations of 1715 may be performed in accordance with examples as disclosed herein. In some examples, aspects of the operations of 1715 may be performed by a DCI manager 645 as described with reference to FIG. 6.

FIG. 18 shows a flowchart illustrating a method 1800 that supports channel bonding and carrier aggregation for broadcast and multicast communications in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1805, the method may include mapping a broadcast or multicast service associated with a multicast-broadcast network area to frequency resources for a UE to receive the broadcast or multicast service. The operations of 1805 may be performed in accordance with examples as disclosed herein. In some examples, aspects of the operations of 1805 may be performed by a DCI manager 1045 as described with reference to FIG. 10.

At 1810, the method may include encoding a group common downlink control information message that includes scheduling information for the multicast-broadcast network area, the scheduling information indicating the frequency resources on which to receive a broadcast or multicast service associated with the multicast-broadcast network area. The operations of 1810 may be performed in accordance with examples as disclosed herein. In some examples, aspects of the operations of 1810 may be performed by a DCI manager 1045 as described with reference to FIG. 10.

At 1815, the method may include transmitting the broadcast or multicast service on the frequency resources based on the scheduling information. The operations of 1815 may be performed in accordance with examples as disclosed herein. In some examples, aspects of the operations of 1815 may be performed by a DCI manager 1045 as described with reference to FIG. 10.

The following provides an overview of aspects of the present disclosure:

Aspect 1: A method for wireless communications at a UE, comprising: receiving, from a base station, system information indicating a plurality of multicast-broadcast network areas, each multicast-broadcast network area for providing one or more respective services; receiving, for a first multicast-broadcast network area of the plurality of multicast-broadcast network areas and based at least in part on the system information, multicast configuration information indicating a location of multicast scheduling information for the first multicast-broadcast network area; receiving the multicast scheduling information for the first multicast-broadcast network area based at least in part on the multicast configuration information, the multicast scheduling information indicating frequency resources on which to receive a broadcast or multicast service associated with the first multicast-broadcast network area; and receiving the broadcast or multicast service on the frequency resources based at least in part on the multicast scheduling information.

Aspect 2: The method of aspect 1, wherein receiving the multicast configuration information and the multicast scheduling information comprises receiving the multicast configuration information, the multicast scheduling information, or both, via a primary carrier allocated for transmission of the multicast configuration information, the multicast scheduling information, or both, the frequency resources comprise first resources of the primary carrier and second resources of at least one secondary carrier.

Aspect 3: The method of any of aspects 1 through 2, wherein receiving the multicast configuration information and the multicast scheduling information comprises receiving the multicast configuration information, the multicast scheduling information, or both, via a secondary carrier, a primary carrier and the secondary carrier are allocated for transmission of the multicast configuration information, the multicast scheduling information, or both, and the frequency resources comprise first resources of the primary carrier and second resources of the secondary carrier.

Aspect 4: The method of any of aspects 1 through 3, wherein the multicast scheduling information indicates at least a first subset of the frequency resources and a second subset of the frequency resources associated with the broadcast or multicast service.

Aspect 5: The method of aspect 4, wherein the first subset of the frequency resources are non-contiguous with the second subset of the frequency resources.

Aspect 6: The method of any of aspects 4 through 5, wherein the frequency resources comprise a plurality of carriers of a carrier aggregation, a plurality of channels of a channel-bonding configuration, a plurality of cells, or any combination thereof.

Aspect 7: The method of any of aspects 4 through 6, wherein the multicast scheduling information indicates at least the first subset of the frequency resources and the second subset of the frequency resources from a set of candidate subsets of frequency resources configured by the system information.

Aspect 8: The method of any of aspects 1 through 7, wherein the multicast scheduling information comprises: a mapping of a plurality of subsets of the frequency resources to one or more respective services for the first multicast-broadcast network area.

Aspect 9: The method of any of aspects 1 through 8, further comprising: receiving, from the base station, control signaling indicating a first set of instances of the multicast scheduling information allocated for a first type of UE that includes the UE, and a second set of instances of second multicast scheduling information allocated for a second type of UE; and monitoring for the multicast scheduling information during the first set of instances of the multicast scheduling information based at least in part on receiving the control signaling and the UE being the first type of UE.

Aspect 10: The method of aspect 9, wherein the second set of instances of the second multicast scheduling information indicates a single frequency resource on which to receive a broadcast or multicast service.

Aspect 11: The method of any of aspects 1 through 10, further comprising receiving, from the base station, an indication of a redundancy version configuration associated with instances of transport block transmission over the frequency resources, wherein receiving the multicast or broadcast service is based at least in part on the redundancy version configuration.

Aspect 12: The method of aspect 11, further comprising receiving, from the base station, control signaling comprising a plurality of redundancy version configurations that include the redundancy version configuration, each of the plurality of redundancy version configurations associated with a respective index value of a plurality of index values, wherein the indication of the redundancy version configuration comprises the respective index value associated with the redundancy version configuration.

Aspect 13: The method of any of aspects 11 through 12, wherein the redundancy version configuration comprises a pattern of time resources, a pattern associated with the frequency resources, or both, for receiving the broadcast or multicast service across the frequency resources.

Aspect 14: The method of any of aspects 1 through 13, further comprising receiving, from the base station, an indication of an outer coding configuration for receiving the broadcast or multicast service across the frequency resources.

Aspect 15: The method of any of aspects 1 through 14, further comprising receiving, from the base station, control signaling indicating a layer within a protocol stack associated with combining the broadcast or multicast service across the frequency resources, wherein the layer associated with the combining comprises a medium access control layer or a physical layer.

Aspect 16: The method of aspect 15, wherein the UE combines a plurality of HARQ redundancy versions across the of frequency resources.

Aspect 17: The method of any of aspects 1 through 16, wherein the system information comprises an indication that at least one of the one or more respective services are configured for a carrier aggregation deployment or a channel bonding deployment.

Aspect 18: A method for wireless communications at a base station, comprising: transmitting, to a UE, system information indicating a plurality of multicast-broadcast network areas, each multicast-broadcast network area for providing one or more respective services; transmitting, for a first multicast-broadcast network area of the plurality of multicast-broadcast network areas and according to the system information, multicast configuration information indicating a location of multicast scheduling information for the first multicast-broadcast network area; transmitting the multicast scheduling information for the first multicast-broadcast network area based at least in part on the multicast configuration information, the multicast scheduling information indicating frequency resources on which to receive a broadcast or multicast service associated with the first multicast-broadcast network area; and transmitting the broadcast or multicast service on the frequency resources based at least in part on the multicast scheduling information.

Aspect 19: The method of aspect 18, wherein transmitting the multicast configuration information and the multicast scheduling information comprises transmitting the multicast configuration information, the multicast scheduling information, or both, via a primary carrier allocated for transmission of the multicast configuration information, the multicast scheduling information, or both, the frequency resources comprise first resources of the primary carrier and second resources of at least one secondary carrier.

Aspect 20: The method of any of aspects 18 through 19, wherein transmitting the multicast configuration information and the multicast scheduling information comprises transmitting the multicast configuration information, the multicast scheduling information, or both, via a secondary carrier, a primary carrier and the secondary carrier are allocated for transmission of the multicast configuration information, the multicast scheduling information, or both, and the frequency resources comprise first resources of the primary carrier and second resources of the secondary carrier.

Aspect 21: The method of any of aspects 18 through 20, wherein the multicast scheduling information indicates at least a first subset of the frequency resources and a second subset of the frequency resources associated with the broadcast or multicast service.

Aspect 22: The method of aspect 21, wherein the first subset of the frequency resources are non-contiguous with the second subset of the frequency resources.

Aspect 23: The method of any of aspects 21 through 22, wherein the frequency resources comprise a plurality of carriers of a carrier aggregation, a plurality of channels of a channel-bonding configuration, a plurality of cells, or any combination thereof.

Aspect 24: The method of any of aspects 18 through 23, wherein the multicast scheduling information comprises a mapping of a plurality of subsets of the frequency resources to one or more respective services for the first multicast-broadcast network area.

Aspect 25: The method of any of aspects 18 through 24, further comprising transmitting, to the UE, control signaling indicating a first set of instances of the multicast scheduling information allocated for a first type of UE that includes the UE, and a second set of instances of a second multicast scheduling information allocated for a second type of UE.

Aspect 26: A method for wireless communications at a UE, comprising: monitoring for downlink control information on a control resource set; decoding a group common downlink control information message that includes scheduling information for a multicast-broadcast network area, the scheduling information indicating frequency resources on which to receive a broadcast or multicast service associated with the multicast-broadcast network area; and receiving the broadcast or multicast service on the frequency resources based at least in part on the scheduling information.

Aspect 27: The method of aspect 26, wherein receiving the broadcast or multicast service comprises receiving a transport block that is mapped over the frequency resources, the frequency resources comprise a single carrier of a carrier aggregation or a plurality of carriers of a carrier aggregation.

Aspect 28: The method of aspect 27, wherein the frequency resources comprise a virtual carrier comprising a plurality of carriers.

Aspect 29: The method of any of aspects 26 through 28, wherein receiving the broadcast or multicast service comprises receiving the multicast or broadcast service according to a threshold time delay.

Aspect 30: A method for wireless communications at a base station, comprising: mapping a broadcast or multicast service associated with a multicast-broadcast network area to frequency resources for a UE to receive the broadcast or multicast service; encoding a group common downlink control information message that includes scheduling information for the multicast-broadcast network area, the scheduling information indicating the frequency resources on which to receive a broadcast or multicast service associated with the multicast-broadcast network area; and transmitting the broadcast or multicast service on the frequency resources based at least in part on the scheduling information.

Aspect 31: An apparatus for wireless communications at a UE, comprising a processor; memory coupled with the processor; and instructions stored in the memory and executable by the processor to cause the apparatus to perform a method of any of aspects 1 through 17.

Aspect 32: An apparatus for wireless communications at a UE, comprising at least one means for performing a method of any of aspects 1 through 17.

Aspect 33: A non-transitory computer-readable medium storing code for wireless communications at a UE, the code comprising instructions executable by a processor to perform a method of any of aspects 1 through 17.

Aspect 34: An apparatus for wireless communications at a base station, comprising a processor; memory coupled with the processor; and instructions stored in the memory and executable by the processor to cause the apparatus to perform a method of any of aspects 18 through 25.

Aspect 35: An apparatus for wireless communications at a base station, comprising at least one means for performing a method of any of aspects 18 through 25.

Aspect 36: A non-transitory computer-readable medium storing code for wireless communications at a base station, the code comprising instructions executable by a processor to perform a method of any of aspects 18 through 25.

Aspect 37: An apparatus for wireless communications at a UE, comprising a processor; memory coupled with the processor; and instructions stored in the memory and executable by the processor to cause the apparatus to perform a method of any of aspects 26 through 29.

Aspect 38: An apparatus for wireless communications at a UE, comprising at least one means for performing a method of any of aspects 26 through 29.

Aspect 39: A non-transitory computer-readable medium storing code for wireless communications at a UE, the code comprising instructions executable by a processor to perform a method of any of aspects 26 through 29.

Aspect 40: An apparatus for wireless communications at a base station, comprising a processor; memory coupled with the processor; and instructions stored in the memory and executable by the processor to cause the apparatus to perform a method of any of aspects 30 through 30.

Aspect 41: An apparatus for wireless communications at a base station, comprising at least one means for performing a method of any of aspects 30 through 30.

Aspect 42: A non-transitory computer-readable medium storing code for wireless communications at a base station, the code comprising instructions executable by a processor to perform a method of any of aspects 30 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a network entity, system information indicating a plurality of multicast-broadcast network areas and a plurality of candidate frequency resources, each multicast-broadcast network area for providing one or more respective services;
receiving, for a first multicast-broadcast network area of the plurality of multicast-broadcast network areas and based at least in part on the system information, multicast configuration information indicating a time and frequency location of multicast scheduling information for the first multicast-broadcast network area;
receiving the multicast scheduling information for the first multicast-broadcast network area based at least in part on the multicast configuration information, the multicast scheduling information indicating a first subset of frequency resources and a second subset of the frequency resources from the plurality of candidate frequency resources on which to receive a first broadcast or multicast service associated with the first multicast-broadcast network area, wherein frequency resources of the first subset of the frequency resources are non-contiguous in a frequency domain with frequency resources of the second subset of the frequency resources, and wherein the multicast scheduling information comprises a first mapping of the first subset of frequency resources and the second subset of frequency resources to the first broadcast or multicast service associated with the first multicast-broadcast network area and a second mapping of a third subset of frequency resources to a second broadcast or multicast service associated with the first multicast-broadcast network area, the first broadcast or multicast service different than the second broadcast or multicast service; and
receiving at least the first broadcast or multicast service on the first subset of the frequency resources and the second subset of the frequency resources based at least in part on the multicast scheduling information.

2. The method of claim 1, wherein receiving the multicast configuration information and the multicast scheduling information comprises receiving the multicast configuration information, the multicast scheduling information, or both, via a primary carrier allocated for transmission of the multicast configuration information, the multicast scheduling information, or both, wherein the first subset of the frequency resources comprises first resources of the primary carrier and the second subset of the frequency resources comprises second resources of at least one secondary carrier.

3. The method of claim 1, wherein receiving the multicast configuration information and the multicast scheduling information comprises receiving the multicast configuration information, the multicast scheduling information, or both, via a secondary carrier, wherein a primary carrier and the secondary carrier are allocated for transmission of the multicast configuration information, the multicast scheduling information, or both, and wherein the first subset of the frequency resources comprises first resources of the primary carrier and the second subset of the frequency resources comprises second resources of the secondary carrier.

4. The method of claim 1, wherein the frequency resources comprise a plurality of carriers of a carrier aggregation, a plurality of channels of a channel-bonding configuration, a plurality of cells, or any combination thereof.

5. The method of claim 1, further comprising:
receiving, from the network entity, control signaling indicating a first set of instances of the multicast scheduling information allocated for a first type of UE that includes the UE, and a second set of instances of second multicast scheduling information allocated for a second type of UE; and
monitoring for the multicast scheduling information during the first set of instances of the multicast scheduling information in accordance with receiving the control signaling and the UE being the first type of UE.

6. The method of claim 5, wherein the second set of instances of the second multicast scheduling information indicates a single frequency resource on which to receive a broadcast or multicast service.

7. The method of claim 1, further comprising receiving, from the network entity, an indication of a redundancy version configuration associated with instances of transport block transmission over the frequency resources, wherein receiving the multicast or broadcast service is based at least in part on the redundancy version configuration.

8. The method of claim 7, further comprising receiving, from the network entity, control signaling comprising a plurality of redundancy version configurations that include the redundancy version configuration, each of the plurality of redundancy version configurations associated with a respective index value of a plurality of index values, wherein the indication of the redundancy version configuration comprises the respective index value associated with the redundancy version configuration.

9. The method of claim 7, wherein the redundancy version configuration comprises a pattern of time resources, a pattern associated with the frequency resources, or both, for receiving the broadcast or multicast service via the frequency resources.

10. The method of claim 1, further comprising receiving, from the network entity, an indication of an outer coding configuration for receiving the broadcast or multicast service via the frequency resources.

11. The method of claim 1, further comprising receiving, from the network entity, control signaling indicating a layer within a protocol stack associated with combining the broadcast or multicast service via the frequency resources, wherein the layer associated with the combining comprises a medium access control layer or a physical layer.

12. The method of claim 11, wherein the UE combines a plurality of hybrid automatic repeat request (HARQ) redundancy versions via the frequency resources.

13. The method of claim 1, wherein the system information comprises an indication that at least one of the one or more respective services are configured for a carrier aggregation deployment or a channel bonding deployment.

14. A method for wireless communications at a network entity, comprising:

transmitting, to a user equipment (UE), system information indicating a plurality of multicast-broadcast network areas and a plurality of candidate frequency resources, each multicast-broadcast network area for providing one or more respective services;

transmitting, for a first multicast-broadcast network area of the plurality of multicast-broadcast network areas and according to the system information, multicast configuration information indicating a time and frequency location of multicast scheduling information for the first multicast-broadcast network area;

transmitting the multicast scheduling information for the first multicast-broadcast network area based at least in part on the multicast configuration information, the multicast scheduling information indicating a first subset of frequency resources and a second subset of the frequency resources from the plurality of candidate frequency resources on which to receive a first broadcast or multicast service associated with the first multicast-broadcast network area, wherein frequency resources of the first subset of the frequency resources are non-contiguous in a frequency domain with frequency resources of the second subset of the frequency resources, and wherein the multicast scheduling information comprises a first mapping of the first subset of frequency resources and the second subset of frequency resources to the first broadcast or multicast service associated with the first multicast-broadcast network area and a second mapping of a third subset of frequency resources to a second broadcast or multicast service associated with the first multicast-broadcast network area, the first broadcast or multicast service different than the second broadcast or multicast service; and transmitting at least the first broadcast or multicast service on the first subset of the frequency resources and the second subset of the frequency resources based at least in part on the multicast scheduling information.

15. The method of claim 14, wherein transmitting the multicast configuration information and the multicast scheduling information comprises transmitting the multicast configuration information, the multicast scheduling information, or both, via a primary carrier allocated for transmission of the multicast configuration information, the multicast scheduling information, or both, wherein the first subset of the frequency resources comprises first resources of the primary carrier and the second subset of the frequency resources comprises second resources of at least one secondary carrier.

16. The method of claim 14, wherein transmitting the multicast configuration information and the multicast scheduling information comprises transmitting the multicast configuration information, the multicast scheduling information, or both, via a secondary carrier, wherein a primary carrier and the secondary carrier are allocated for transmission of the multicast configuration information, the multicast scheduling information, or both, and wherein the first subset of the frequency resources comprises first resources of the primary carrier and the second subset of the frequency resources comprises second resources of the secondary carrier.

17. The method of claim 14, wherein the frequency resources comprise a plurality of carriers of a carrier aggregation, a plurality of channels of a channel-bonding configuration, a plurality of cells, or any combination thereof.

18. The method of claim 14, further comprising transmitting, to the UE, control signaling indicating a first set of instances of the multicast scheduling information allocated for a first type of UE that includes the UE, and a second set of instances of a second multicast scheduling information allocated for a second type of UE.

19. The method of claim 14, wherein indicating the first subset of the frequency resources and the second subset of the frequency resources from the plurality of candidate frequency resources is the first broadcast or multicast service associated with the first multicast-broadcast network area.

20. A method for wireless communications at a user equipment (UE), comprising:

monitoring for downlink control information on a control resource set;

decoding a group common downlink control information message that includes scheduling information for a multicast-broadcast network area, the scheduling information indicating a first subset of frequency resources and a second subset of frequency resources on which to receive a first broadcast or multicast service associated with the multicast-broadcast network area, wherein frequency resources of the first subset of the frequency resources are non-contiguous in a frequency domain with frequency resources of the second subset of the frequency resources, and wherein the scheduling information comprises a first mapping of the first subset of frequency resources and the second subset of frequency resources to the first broadcast or multicast service associated with the first multicast-broadcast network area and a second mapping of a third subset of frequency resources to a second broadcast or multicast service associated with the first multicast-broadcast network area, the first broadcast or multicast service different than the second broadcast or multicast service; and receiving at least the first broadcast or multicast service on the first subset of the frequency resources and the second subset of the frequency resources based at least in part on the scheduling information.

21. The method of claim 20, wherein receiving the broadcast or multicast service comprises receiving a transport block that is mapped over the frequency resources, wherein the frequency resources comprise a single carrier of a carrier aggregation or a plurality of carriers of a carrier aggregation.

22. The method of claim 21, wherein the frequency resources comprise a virtual carrier comprising a plurality of carriers.

23. The method of claim 20, wherein receiving the broadcast or multicast service comprises receiving the multicast or broadcast service according to a threshold time delay.

24. A method for wireless communications at a network entity, comprising:

mapping a broadcast or multicast service associated with a multicast-broadcast network area to frequency resources for a user equipment (UE) to receive the broadcast or multicast service;

encoding a group common downlink control information message that includes scheduling information for the multicast-broadcast network area, the scheduling information indicating a first subset of the frequency resources and a second subset of the frequency resources on which to receive a broadcast or multicast service associated with the multicast-broadcast network area, wherein frequency resources of the first subset of the frequency resources are non-contiguous in a frequency domain with frequency resources of the second subset of the frequency resources, and wherein the scheduling information comprises a first mapping of the first subset of frequency resources and the second subset of frequency resources to the first broadcast or multicast service associated with the first multicast-broadcast network area and a second mapping of a third subset of frequency resources to a second broadcast or multicast service associated with the first multicast-broadcast network area, the first broadcast or multicast service different than the second broadcast or multicast service; and transmitting at least the first broadcast or multicast service on the first subset of the frequency resources and the second subset of the frequency resources based at least in part on the scheduling information.

\*　\*　\*　\*　\*